US006323460B1

(12) United States Patent
Ohtsuka

(10) Patent No.: US 6,323,460 B1
(45) Date of Patent: *Nov. 27, 2001

(54) IMAGE HEATING APPARATUS IN WHICH FIRST AND SECOND HEATING RESISTORS ARE WITHIN A WIDTH OF A NIP THROUGH WHICH A RECORDING MATERIAL PASSES

(75) Inventor: Yasumasa Ohtsuka, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,618

(22) Filed: Sep. 9, 1997

Related U.S. Application Data

(63) Continuation of application No. 08/521,062, filed on Aug. 29, 1995, now abandoned.

(30) Foreign Application Priority Data

| | | |
|---|---|---|
| Aug. 30, 1994 | (JP) | 6-230780 |
| Nov. 30, 1994 | (JP) | 6-321438 |

(51) Int. Cl.[7] .......... B23K 26/36; H05B 3/00; G03G 15/20; G03G 15/00

(52) U.S. Cl. .......... 219/216; 219/539; 219/121.69

(58) Field of Search .......... 219/216, 539, 219/541, 543, 121.68, 121.69; 399/328, 329

(56) References Cited

U.S. PATENT DOCUMENTS

| | | | | |
|---|---|---|---|---|
| 5,162,634 | | 11/1992 | Kusaka et al. . | |
| 5,306,898 | * | 4/1994 | Yukkawa et al. | 219/543 |
| 5,338,919 | * | 8/1994 | Tagashira et al. | 219/543 |
| 5,376,773 | * | 12/1994 | Masuda et al. | 219/543 |
| 5,444,521 | | 8/1995 | Tomoyuki et al. . | |
| 5,464,964 | | 11/1995 | Okuda et al. . | |

FOREIGN PATENT DOCUMENTS

| | | | | |
|---|---|---|---|---|
| 2718822 | * | 11/1978 | (DE) | 219/543 |
| 3248203 | * | 6/1984 | (DE) | 219/543 |
| 0360418 | | 3/1990 | (EP) . | |
| 0372479 | | 6/1990 | (EP) . | |
| 0486890 | | 5/1992 | (EP) . | |
| 0546495 | * | 6/1993 | (EP) | 355/285 |
| 0604977 | * | 7/1994 | (EP) | 355/285 |
| 1278411 | * | 6/1972 | (GB) | 219/543 |
| 03-226985 | * | 10/1991 | (JP) | 219/216 |
| 05-273880 | * | 10/1993 | (JP) | 355/285 |
| 06-274068 | * | 9/1994 | (JP) | 355/285 |
| 04-204981 | * | 7/1992 | (JP) | 355/289 |
| 061188178 | * | 4/1994 | (JP) | 355/290 |

OTHER PUBLICATIONS

European Search Report EP 95 113536 May 9, 1996.

* cited by examiner

*Primary Examiner*—Samuel M. Heinrich
(74) *Attorney, Agent, or Firm*—Fitzpatrick, Cella, Harper & Scinto

(57) ABSTRACT

An image heating apparatus includes (i) a heater having an elongated base member, first and second resistors extended on the base member in a longitudinal direction thereof, an electrical connecting portion, adjacent one end of the base member, for electrically connecting the first and second resistors, first and second electrodes provided only adjacent the other end of the base member and electrically connected with the first and second resistors, respectively, wherein the first and second resistors generate heat by electrical energy supplied between the first and second electrodes, (ii) a film slidable relative to the heater and (iii) a back-up member for forming a nip with the heater with the film therebetween, wherein a recording material is passed through the nip, and an image on the recording material is heated by the heat from the heater through the film, while the recording material is passed through the nip. The first and second resistors are within a width, in a direction of movement of the recording material, of the nip.

34 Claims, 19 Drawing Sheets

IMAGE HEATING APPARATUS IN WHICH FIRST AND SECOND HEATING RESISTORS ARE WITHIN A WIDTH OF A NIP THROUGH WHICH A RECORDING MATERIAL PASSES

This application is a continuation of application Ser. No. 08/521,062, filed Aug. 29, 1995, now abandoned.

FIELD OF THE INVENTION AND RELATED ART

The present invention relates to a fixing device usable with an image forming apparatus such as a copying machine and a printer, more particularly to a heater usable for a fixing device thereof.

Recently, a film heating type heating device has been proposed and has been put into practice.

An example of such a heating device is shown in FIG. 9(*a*).

In FIG. 9(*a*), designated by 8 is a film; 9 is a pressing roller; 10 is a heating member; and 11 is a supporting member for supporting the heating member. In this heating device, a recording material P carrying an unfixed toner image T is introduced into a nip formed between the heating member 10 and the pressing roller 9 with the film 8 therebetween, and the unfixed toner image is fixed on the recording material by the heat from the heating member 10 through the film 8.

The film heating type heating device is advantageous in that use can be made with a heating member or thin film having low heat capacities which exhibit a quick temperature rise, and therefore, the temperature of the heating member can be quickly increased, thus permitting electric power saving and reduction of the wait time.

FIG. 9(*b*), and FIG. 9(*a*) are top plan views of such a heating member.

In FIG. 9(*b*), designated by 10 is a heating member, which comprises a heater substrate 2, a heat generating resistor (energization heat generating element) pattern 3 on one side of the heater substrate 2, a conductive member pattern 4, an electroconductive pattern 4*a*, two electric energy supply electrode patterns 5 and 6, and a surface protection layer 7 covering the heat generating resistor pattern 3 and the conductive member pattern 4, and the like.

The heat generating resistor pattern 3 is formed by coating through screen printing or the like electric resistance material paste (resistance paste) of silver palladium (Ag/Pb), $Ta_2N$ or the like into a thickness of 10 microns and a width of 1–3 mm, for example, on a ceramic base material in a longitudinal direction, and by sintering it.

The conductive member pattern 4 is formed along a longitudinal surface of the ceramic base material in the form of a stripe extending substantially parallel with the heat generating resistor pattern 3.

The two electric energy supply electrode patterns 5, 6 are juxtaposed adjacent one end side of the ceramic base material 2.

An end of the heat generating resistor pattern 3 is electrically connected by the electroconductive pattern 4*a* and the electric energy supply electrode pattern 5. An end of the conductive member pattern 4 adjacent said end is electrically connected with the other electric energy supply electrode pattern 6. The other ends of the heat generating resistor pattern 3 and conductive member pattern 4 are electrically connected with each other.

The conductive member pattern 4, the conduction pattern 4*a*, and the two electric energy supply electrode patterns 5, 6, are formed by pattern coating using screen printing or the like and sintering of electroconductive material paste such as Ag on the surface of the ceramic base material 2.

The substantially parallel heat generating resistor pattern 3 and conductive member pattern 4 form a forward path and backward path of energization in the direction of the length of the heating member between two electric energy supply electrode patterns 5, 6 adjacent one longitudinal end of the ceramic base material 2.

In the case of this example, the two electric energy supply electrode portions 5, 6 for the heat generating resistor pattern 3 are disposed adjacent one longitudinal end of the heating member substrate (ceramic base material), and therefore, the electric energy supply connector for the heating member 10 may be provided adjacent only one longitudinal end, so that the electric energy supply for wiring is simplified, and the wiring operation is easy.

With this structure, the heat generating resistor pattern 3 constitutes a forward path of energization, and the backward path is constituted by a conductive member pattern 4 having a low resistance and therefore, does not generate heat. In this case, a difference in thermal expansion coefficient occurs at the heating member portion in the forward path side and backward path side so that the heating member is relatively easily broken.

The heating member 10 has a relatively large width of the substrate 2 to permit formation of the conductive member pattern 4. If, however, the width of the heat generating resistor pattern 3 is increased to increase the fixing property, the width of the substrate 2 has to be increased from the standpoint of withstanding voltage, with the result of deterioration of the productivity.

SUMMARY OF THE INVENTION

Accordingly, it is a principal object of the present invention to provide a heating member and a fixing device having the same wherein breakage of the heating member due to the strain resulting from a difference in thermal-expansion is effectively prevented.

It is another object of the present invention to provide a heating member and a fixing device wherein the productivity is not lowered even if the fixing property is improved.

According to an aspect of the present invention, there is provided a heater comprising: an elongated base member; first and second resistors extended in a longitudinal direction of said base member; an electric conducting portion, adjacent an end of said base member, for electrically conducting said first resistor and second resistor; and electrodes, provided only adjacent the other end of said base member, for supplying electric energy to said first resistor and second resistor to generate heat by said electrodes.

According to another aspect of the present invention, there is provided an image fixing apparatus comprising: a heater; a film having a surface in slidable contact with said heater and an opposite surface movable together with a recording material, wherein an unfixed image is fixed on the recording material by the heat from said heater; said heater including: an elongated base member; first and second resistors extended in a longitudinal direction of said base member; an electric conducting portion, adjacent an end of said base member, for electrically conducting said first resistor and second resistor; and electrodes, provided only adjacent the other end of said base member, for supplying electric energy to said first resistor and second resistor to generate heat by said electrodes.

These and other objects, features and advantages of the present invention will become more apparent upon a consideration of the following invention taken in conjunction with the accompanying drawings.

BRIEF DESCRIPTION OF THE DRAWINGS

FIG. 9(*b*) is an enlarged of a heating member of FIG. 9(*a*).

DESCRIPTION OF THE PREFERRED EMBODIMENT

Figure 1:
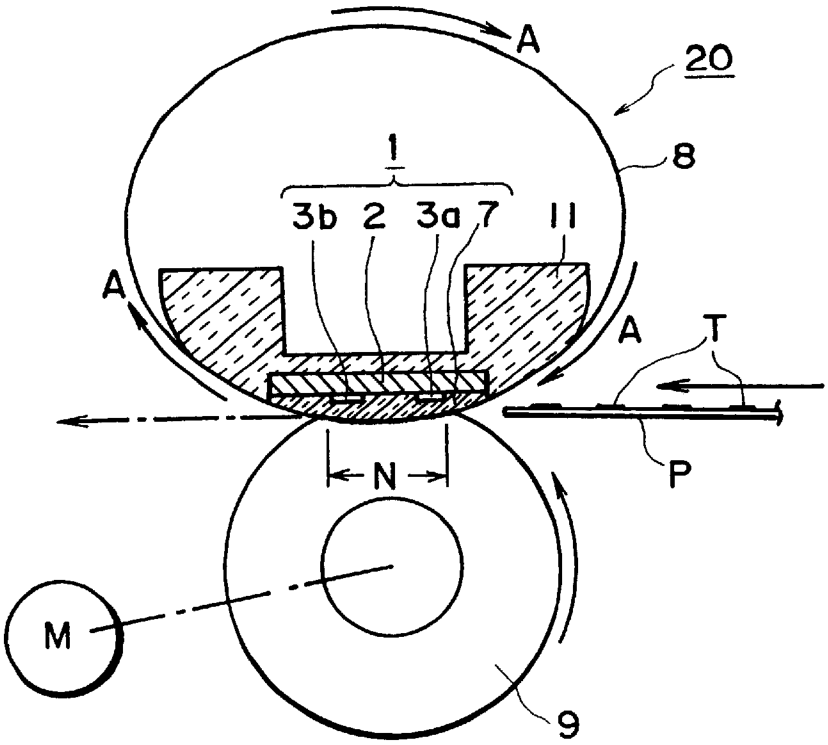
FIG. 1 is a sectional view of a fixing device according to an embodiment of the present invention.
Figure 2:
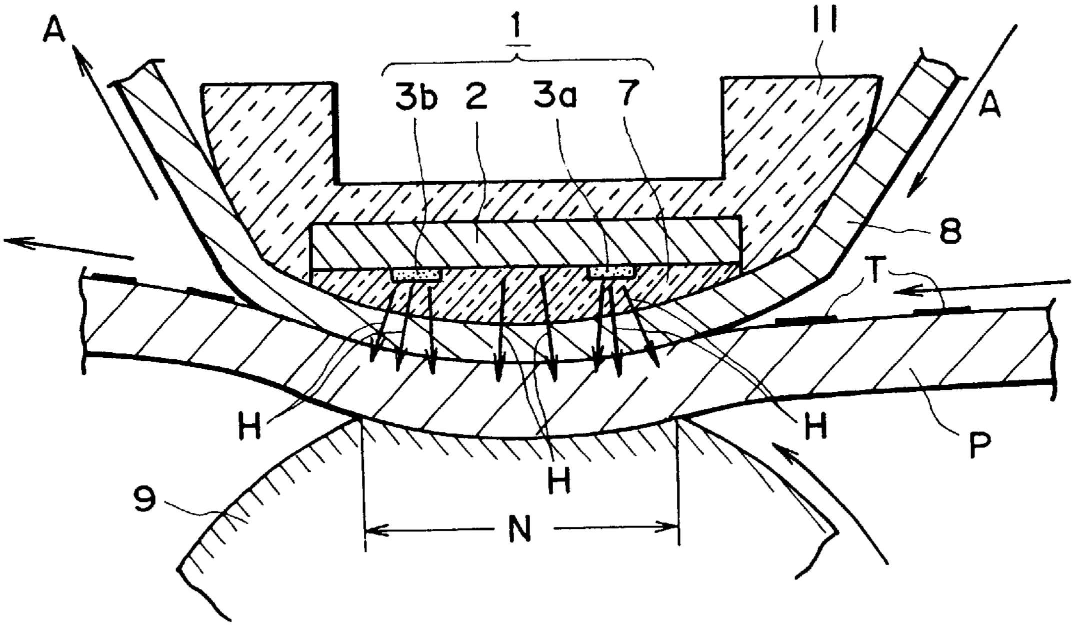
FIG. 2 is an enlarged view of a nip used in FIG. 1.
Figure 3:
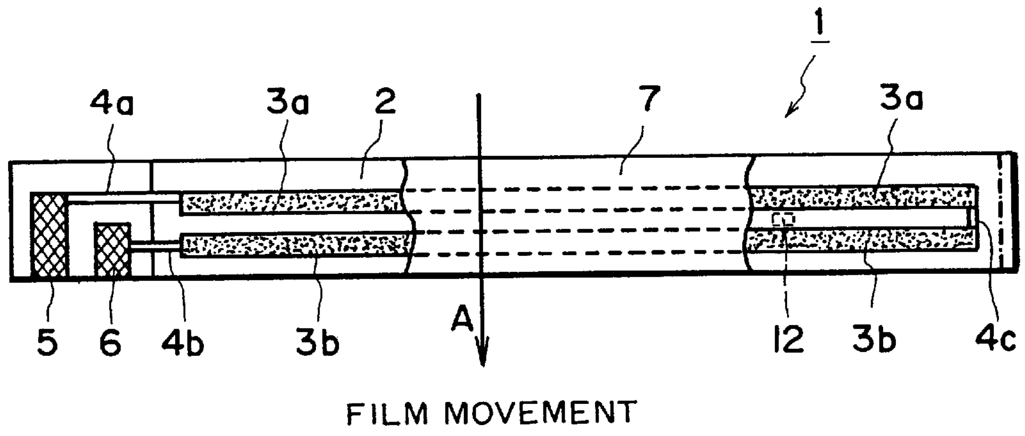
FIG. 3 is a top plan view of a heating member.

FIG. 1 is a sectional view of a fixing device according to an embodiment of the present invention. FIG. 2 is an enlarged view of a fixing nip of FIG. 1, FIG. 3 is a top plan view of a heating member of FIG. 1, and FIG. 5 is a sectional view of an image forming apparatus using the fixing device of the present invention.

Figure 5:
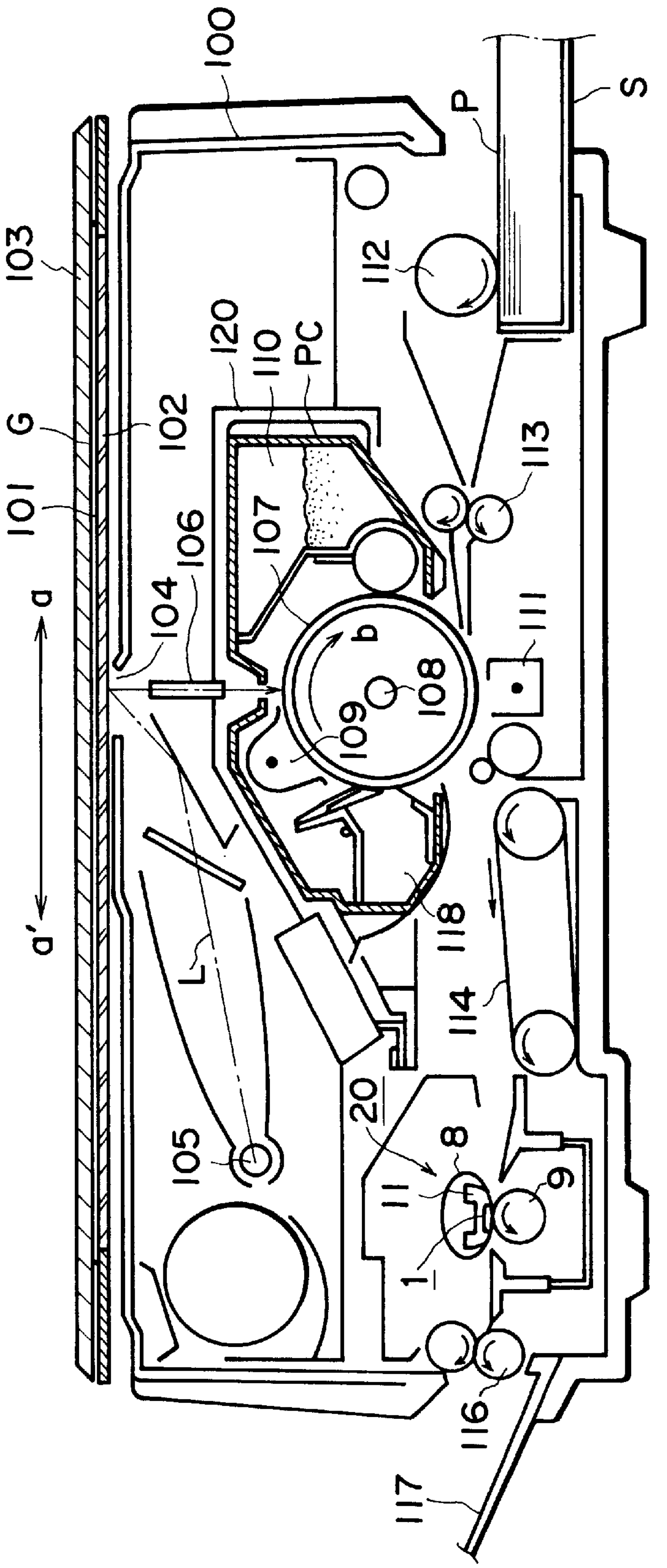
FIG. 5 is a sectional view of an image forming apparatus using the fixing device according to the present invention.

Referring to FIG. 5, the image forming apparatus will first be described.

The image forming apparatus of this embodiment is an electrophotographic copying machine of an original carriage reciprocation type, rotation drum type and process cartridge mounting-and-demounting type.

Designated by 100 is a device casing; 101 is an original carriage of a reciprocation type made of transparent plate member such as glass plate or the like placed on a top side plate 102 of the device casing. It is movable on the top side plate 101 of the casing to the left and right at a predetermined speed.

Designated by G is an original, which is placed face down on the original carriage 101 in alignment with a position index, and an original crimping placed 103 is place thereon.

Designated by 104 is a slit opening portion (original illumination portion) formed in the top side plate 102 of the casing and extended in a direction perpendicular to the sheet of the drawing, namely perpendicular to the direction of the plurality of reciprocation movements of the original carriage 101.

The image surface of the original G faced down on the original carriage 101 is passed via slit opening portion 104 from the right-hand side to the left-hand side during a part of the plurality of reciprocation movements process, toward the right, of the original carriage 101. During this, it is illuminated by the light L from the lamp 105 through the slit opening portion 104 and the transparent original carriage 101, and is scanned. The light reflected by the origin is imaged on the surface of a photosensitive drum 107 by an image element array 106.

Photosensitive drum 107 comprises a photosensitive layer such as a zinc oxide photosensitive layer, organic semiconductor photosensitive layer or the like, and it is rotated in the clockwise direction indicated by an arrow at a predetermined peripheral speed about a center supporting shaft 108. During the rotation, it is uniformly charged to the positive or or non-polarity by a charger 109. The charged surface is exposed to an original image (slit exposure), so that an electrostatic latent image corresponding to the original image is formed on the surface of the photosensitive drum 107.

The electrostatic latent image is visualized sequentially with toner of a resin material or the like usable by heat by a developing device 110, and the resultant toner image is moved into a transfer portion having a transfer discharge device 111.

Designated by S is a cassette, and a sheet in the cassette is fed out one by one by rotation of a feed roller—112 in the cassette. Then, it is fed by registration roller 113*s* at such a timing that when the leading edge of the toner image formation portion on the drum 107 reaches the portion of the transfer discharge device 111, the leading edge of the transfer material sheet P also reaches the position between the transfer discharge device 111 and the photosensitive drum 107.

The toner image is sequentially transferred from the photosensitive drum 107 onto a surface of the sheet by the transfer discharge device 111.

The sheet now having the transferred image is separated from the surface by an unshown separation means, and is fed to a fixing device 20, where the unfixed toner image is heat-fixed. Then, it is discharged to the sheet discharge tray 117 by a discharging roller—116*s* as a print.

The surface of the photosensitive drum 107 after the image transfer is cleaned by a cleaning device 118 so that the deposition contamination such as residual toner is removed, and is repeatedly used for the image formation.

Designated by PC is a process cartridge detachably mounted on the cartridge mounting-and-demounting portion 120 in the main assembly 100. In this example, it contains as a unit photosensitive drum 107 as an image bearing member, a charger 109, a developing device 110, a cleaning device 118 (four process means), which are detachably mountable as a unit.

Referring to FIG. 1, the fixing device will be described.

Designated by 1 is a heating member; 8 is a heat resistive film of polyimide or the like having a thickness of 40 microns–100 microns approx., for example; and 9 is a pressing roller as a pressing member for urging the film 8 to the surface of a surface protection layer. Designated by 7 is a glass layer which is a film sliding surface of the heating member 20.

In this embodiment, the device is a pressing roller driving type. A cylindrical heat resistive film 8, comprising a base material film of polyimide or the like and a heat resistive resin material of PFA or PTRFE or the like having a parting property, is extended loosely around a heating member holder 11 having a rigidity and heat insulation property which supports the heating member 1 of this invention. The pressing roller 9 is press-contacted to the heating member 1 with the film 8 therebetween with a predetermined urging force to form a nip with a heating member 1 with the film 8 therebetween.

The pressing roller 9 is rotated in the counterclockwise direction indicated by the arrow by a driving means M. The film 8 receives rotation force with the aid of frictional force between the roller 9 and the outer surface of the film 8 by the rotation of the pressing roller 9, so that the cylindrical film 8 is rotated around the heating member holder 11 having the heating member 1 in the clockwise direction indicated by the arrow A (lateral direction of heating member 1).

The film 8 is rotated by the pressing roller 9, and the temperature of the heating member 1 rises to a predetermined temperature by energization thereof. In this state, a recording material P carrying the unfixed toner image T (sheet-like material to be heated) is introduced into the nip between the film 8 and the pressing roller 9. The sheet passes through the fixing nip N in contact with the surface of the film 8. During this, the heat of the heating member 1 is applied to the recording material through the film 8, so that the unfixed toner image T is fixed on the surface of the recording material P. The recording material P having passed through the fixing nip N is separated from the surface of the film 8 by the curvature.

Referring to FIG. 3, the heating member will be described.

The heating member 1 in this embodiment, as shown in FIG. 3, comprises two resisters, namely first and second heat generating resistor patterns 3*a*, 3*b*, which extend parallel to each other on one side of a ceramic base material 2 in a direction perpendicular to the movement direction A of the film 8 and recording material P. They are formed by printing, as a stripe pattern of a predetermined width and thickness, resistance paste which is a mixture of a metal such as silver and palladium (Ag/Pb) or $Ta_2N$ and glass paste and by sintering it at approx. 800° C. The materials of the resistance paste for the first and second heat generating resistor patterns are the same, and the width and thickness thereof are almost the same. The heater substrate 2 is a ceramic base material having a heat resistivity, electrically insulative property and low heat capacity property and having a length of 240 mm, width of 10 mm and thickness of 1 mm.

The electric energy supply electrode patterns 5, 6 are juxtaposed on one side of the ceramic base material.

One end portion side of the first heat generating resistor pattern 3*a* is electrically conducted through the electroconductive pattern 4*a* and the electric energy supply electrode pattern 5. The one end portion of the second heat generating resistor pattern 3*b* at the same side is electrically conducted through the electroconductive pattern 4*b* to the other electric energy supply electrode pattern 6. The other end portion of both the heat generating resistor patterns 3*a*, 3*b* are electrically conducted by the electroconductive pattern 4*c*. In this manner, the electric energy supply for the electrode portion is provided only at one end portion of the base material 2.

The electroconductive patterns 4*a*, 4*b*, 4*c*, and electric energy supply electrode patterns 5, 6 are both formed by sintering and pattern coating (through screen printing or the like) of electroconductive material paste such as Ag or the like, on the surface of the ceramic base material 2.

The glass layer 7 is also formed by screen printing and sintering of glass paste. The glass layer 7 as the coating layer may be of heat resistive resin material such as fluorine resin material like tetrafluoroethylene resin material or one with a electrical insulation property and heat resistive ceramic.

(1) First and second resistance member patterns 3*a*, 3*b,*

(2) electroconductive member patterns 4*a*, 4*b*, 4*c* and two electric energy supply electrode patterns 5, 6, (3) and glass layer 7, may be sequentially printed and sintered in this order, may be formed by printing (1) and (2) and then sintering them together and then printing and sintering (3), or may be formed by printing (1), (2) and (3) and then sintering them all together.

The heater 1 is supplied with electrical energy from an unshown electrical energy supplying circuit between the patterns 5 and 6, by which the heat generating resistor patterns 3*a* and 3*b* constituting the forward and backward paths generate heat over the entire length to increase the temperature thereof. The temperature increase is detected by a temperature sensing element 12, and the detected temperature is fed back to a temperature control circuit so that the temperature of the heater is controlled at a predetermined temperature level.

The reversing point of the resistor pattern is of electroconductive pattern 4*c* having a low resistance so that the heat generation thereof is prevented.

Figure 4:
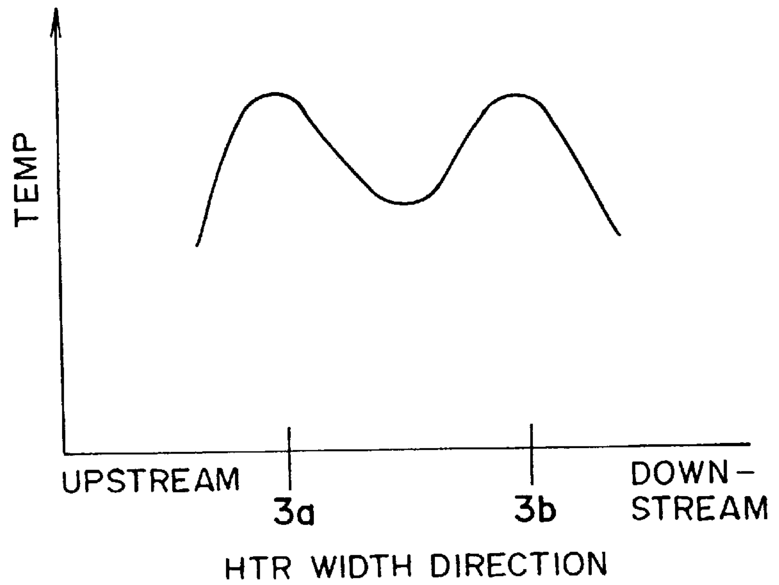
FIG. 4 shows a temperature distribution in a lateral portion of a heating member.

In this embodiment, the resistor patterns 3*a* and 3*b* generate substantially the same amounts of heat. FIG. 4 shows a temperature distribution of the heater 1 in the direction of the width. The temperature distribution provided by the forward and backward paths provide two peaks.

By doing so, the amounts of heat are substantially the same, and therefore, the thermal expansions at the sides of the heater are not different significantly. As a result, the heater 1 is prevented from breaking.

Figure 9A:
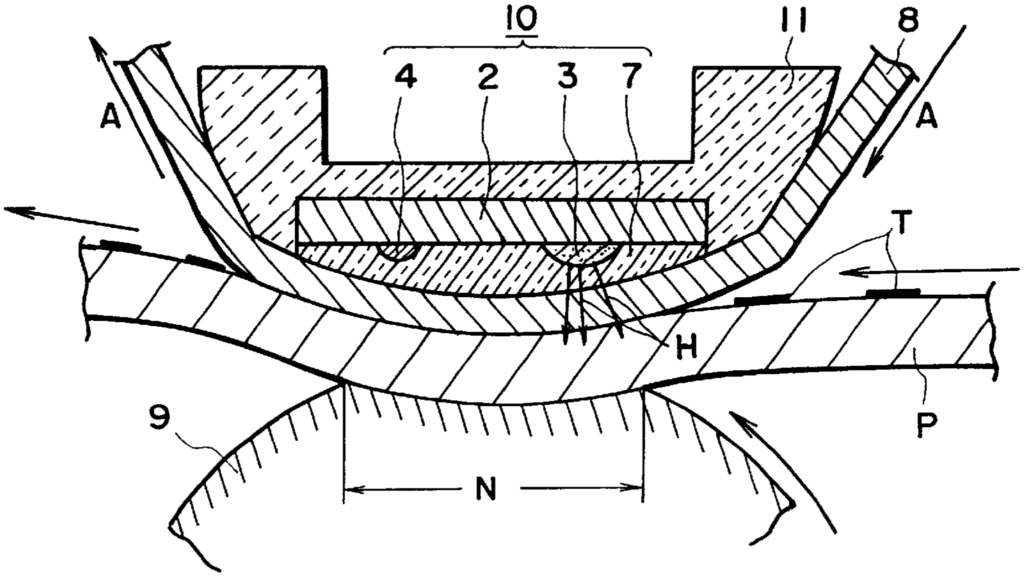
FIG. 9(a) PRIOR ART
FIG. 9(*a*) is an enlarged view of a nip of a conventional fixing device.
Figure 9B:
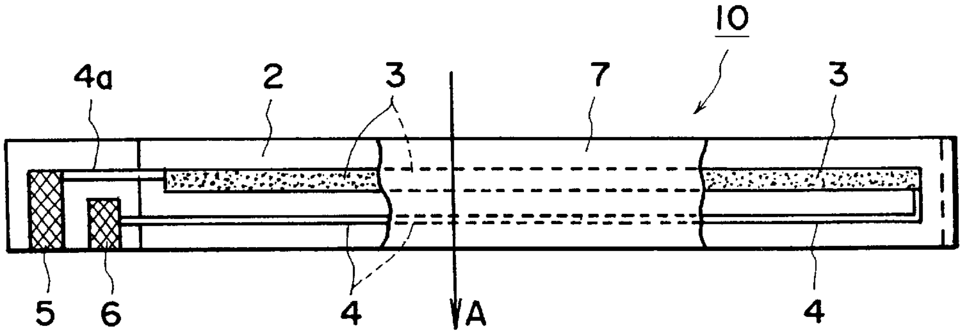
FIG. 9(b) PRIOR ART

When the material to be heated moves in the width direction (arrow A) of the heater 1, the heating period is determined by the width of the resistor pattern, so that the heater 1 of this embodiment provides higher heating effect as compared with the heater 10 of FIGS. 9(*a*) and 9(*b*). When the heater 1 of this embodiment is used, the high temperature portions of the heater 1 through the film 8 are contacted to the member to be heated P over a wider range, and therefore, the heating efficiency is increased.

In FIG. 2, H shows heat flow in the fixing nip N in a film cross-section. In the fixing nip N, two heat flows are generated from the first and second resistor patterns 3*a* and 3*b*, and the flow rate is increased. The temperature between the first and second resistor patterns 3*a* and 3*b* is maintained high by the temperature keeping effect as compared with the outside of the heater, and therefore, the heating efficiency is also enhanced.

In the case of the conventional heater 10, only one heating source for the heat flow is used, and therefore, the heat flow H abruptly decreases away from the bottom of the single pattern 3.

Thus, using the heater of this embodiment, a remarkably high heating effect is provided as compared with the conventional structure, and therefore, the fixing temperature can be decreased, thus avoiding the thermal deterioration of the heater holder 11.

In this embodiment, the conductive material pattern 4 of FIG. 9(*b*) is a resistor, and therefore, the width of the base member is not required to be wider despite the increase of the area of the resistor, and therefore, the productivity of the heater is improved.

Figure 6:
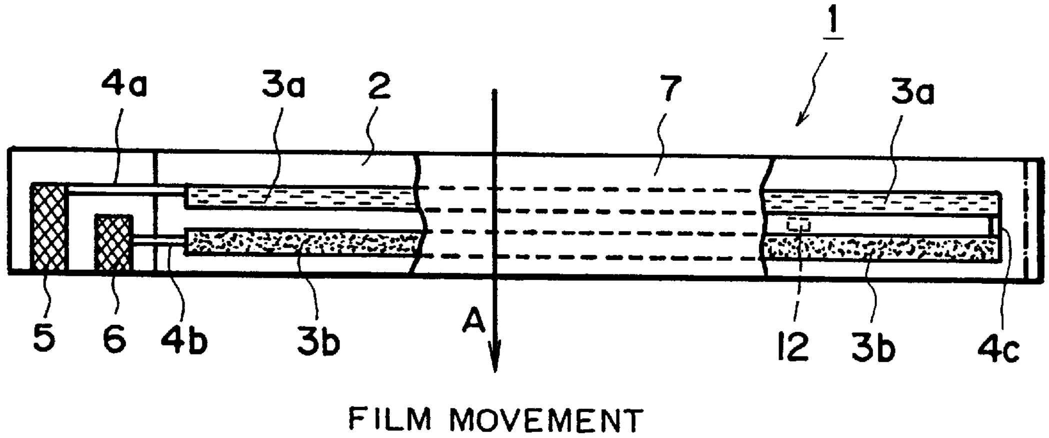
FIG. 6 is a top plan view of a heating member according to a further embodiment.
Figure 7:
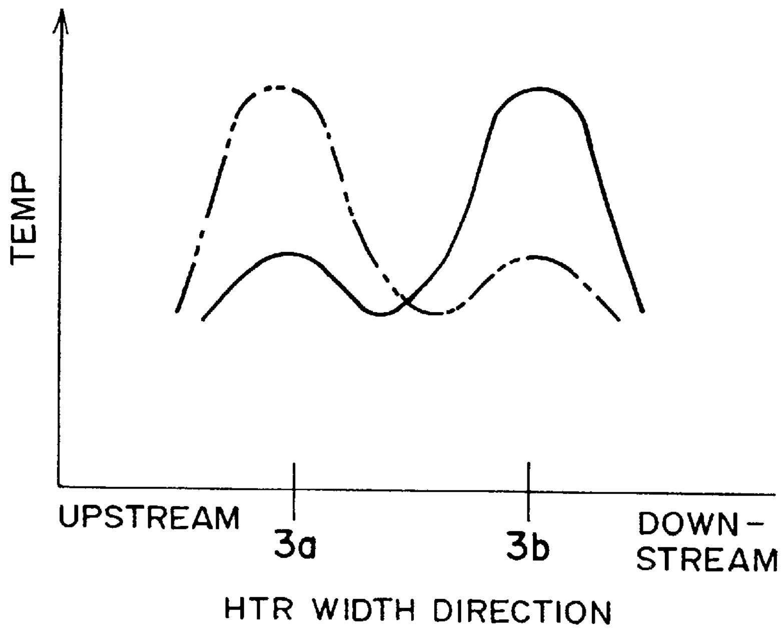
FIG. 7 shows a temperature distribution in the width direction of the heater.

Referring to FIGS. 6 and 7, a heater according to another embodiment of the present invention will be described. Basically, the heater of this embodiment is similar to that of FIG. 3, and therefore, the description will be made only as to the different portions.

In this embodiment, as shown in FIG. 6, a first heat generating resistor 3*a* (forward path), and a second heat generating resistor pattern 3*b* (backward path), have different resistance per unit length by proper selection of the resistance paste material.

In this embodiment, the resistance of the first resistor 3*a* is lower than that of the second resistor 3*b*.

When the electric energy is supplied between the electrode patterns 5 and 6, the first resistor pattern 3*a* and the second resistor pattern 3*b* produce different quantities of heat.

FIG. 7 shows a temperature distribution along a width of the heater of this embodiment. In the case of the heater of FIG. 3 embodiment, the temperature distribution has two substantially equal peaks by the forward and backward paths. However, in this embodiment, the forward peak is lower than the backward peak, as shown in FIG. 7. Both of the resistors generate heat, and therefore, the heater is prevented from breaking or cracking as compared with the heater in which only one generates heat.

When the member to be heated is moved in the direction of the width of the heater, the downstream (backward side) resistor pattern 3*b* (second pattern) is given a relatively higher resistance, than the upstream (backward) first pattern 3*a*. By doing so, the heat supply per unit time to the member to be heated is determined by the temperature difference between the heating member and the member to be heated, and therefore, the member to be heated is heated by the higher temperature heater with an increase of the temperature of the member to be heated, and therefore, higher heating effect can be provided. Thus, the heating efficiency is further improved by increasing the heating value at the downstream side.

On the other hand, in some cases, the temperature is preferably lowered upon the separation between the heater and the member to be heated. For example, in the case of an image fixing apparatus in an electrophotographic machine, it is understood that the toner offset can be effectively prevented by sufficiently cooling the toner image and then separating it from the heater. More particularly, when the heating apparatus of this embodiment is used as an image fixing apparatus for an electrophotographic printer, it is preferable that after the toner image is heated and fused on the recording material P, it is separated from the film 8 after the temperature lowers below the fusing or melting temperature, since then the toner offset can be decreased. In such a case, the resistance of the first heat generating resistor 3*a* at the upstream (foreword path) of the heater is made higher than the second heat generating resistor 3*b* at the downstream side (backward path), by which the temperature distribution along the width of the heater is as shown in FIG. 7 by a chain line. By doing so, the temperature is lower in the backward path than in the forward path. Thus, the heating value in the upstream side is made larger, so that the temperature of the recording material P upon the separation at the downstream side is decreased, thus improving the separation.

As will be understood from the above, the values of the resistances (heating values) of the first and second heat generating resistor patterns 3*a* and 3*b* may be determined in accordance with the purposes.

Figure 8A:
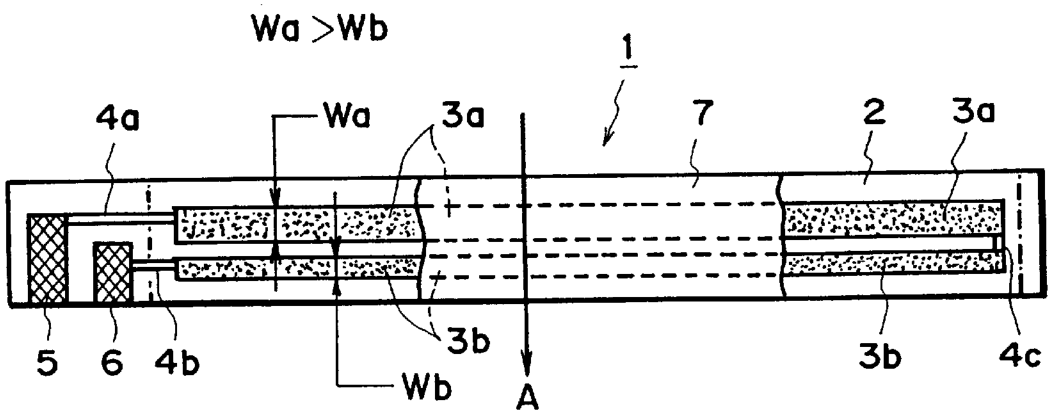
FIGS. 8(*a*) and 8(*b*) are top plan views of a heating member according to another embodiment.
Figure 8B:
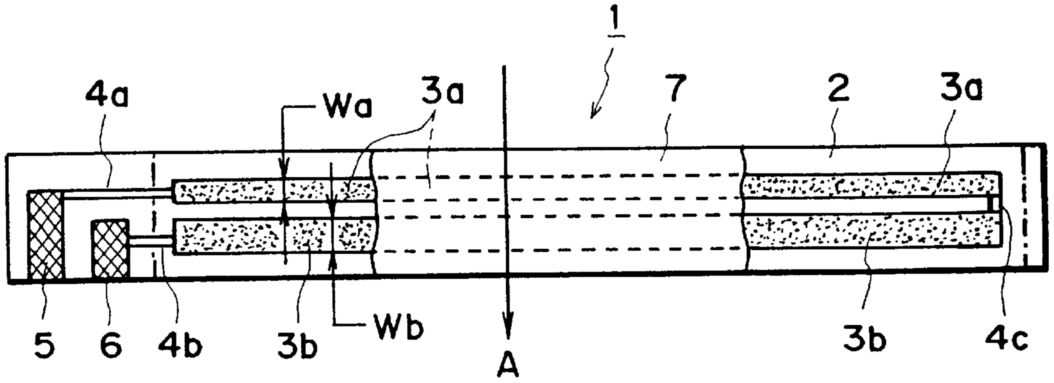

Referring to FIG. 8, a further embodiment will be described. In this embodiment, both of the first and second heat generating resistor patterns 3*a* and 3*b* are formed by pattern-printing into stripes using the same resistor paste which is a mixture of glass paste and silver-palladium or another metal, and sintering it at 800° C. However, the first and second patterns 3*a* and 3*b* have different widths.

In FIG. 8(*a*), the width of the first heat generating resistor pattern 3*a* (forward path), Wa is larger than a width Wb, of the second heat generating resistor pattern 3*b* (backward path).

In FIG. 8(*b*), on the contrary, the width Wb of the second resistor pattern 3*b* (backward path) is larger than the width Wa of the first heat generating resistor pattern 3*a* (forward path).

By supplying electric energy between the electrode patterns 5 and 6, the different quantities of heat are produced by the first pattern 3*a* and the second pattern 3*b*.

In the case of the heater 1 of FIG. 8(*a*), the forward path (upstream side) and the backward path (downstream) have the temperature distributions such that the forward path is lower than the backward path, as in the solid line in FIG. 7.

In the case of the heater 1 of FIG. 8(*b*), on the contrary, the backward path is lower than the forward path as in the chain line in FIG. 7.

As shown in FIG. 8(*a*), if the width Wb of the second pattern 3*b* at the downstream side is smaller than that of the first pattern 3*a*, the heating at the upstream side is not so strong, and therefore, the trailing of the image can be prevented, the trailing being produced by abrupt heating of the recording material P which leads to evaporate the water content in the paper to blow the toner off to the back.

If, as shown in FIG. 8(*b*), the width Wa of the first resistor pattern (upstream) is smaller than the width Wb of the second downstream resistor pattern 3*b*, the temperature is higher at the upstream side so that the ceramic base plate temperature is high at the upstream side of the resistor, and therefore, the heat is transferred to the heat resistive film 11, and therefore, the fixing property increased.

The same advantageous effects as the heater or the heating apparatus in the foregoing embodiments can be provided.

As compared with the FIG. 6 embodiment, the first and second heat generating resistor patterns 3*a* and 3*b* can be formed by one printing process, so that the productivity is improved.

It is a possible alternative that the screen printing is effected for the resistor pattern 3*a* and for the resistor pattern 3*b*, respectively, the viscosities of the printing paste and the squeezing speed are made different to provide different thicknesses of the pattern, so as to make the resistances different.

According to the foregoing embodiments, using the forward and backward patterns of the heat generating resistor, the heating area and the heating period can be increased.

By doing so, the heating efficiency is improved. Additionally, the breaking of the heater due to the strain attributable to the difference of the thermal expansion can be prevented, even if the heating is abrupt.

In the foregoing embodiments, one reciprocation of the heat generating pattern is used, but it may be formed in the form of a plurality of reciprocations.

Figure 10:
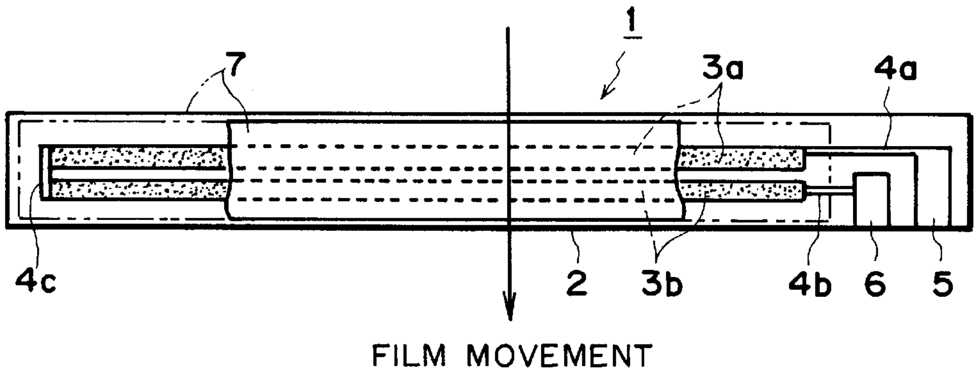
FIG. 10 is an enlarged view of a heating member according to a further embodiment of the present invention.
Figure 11:
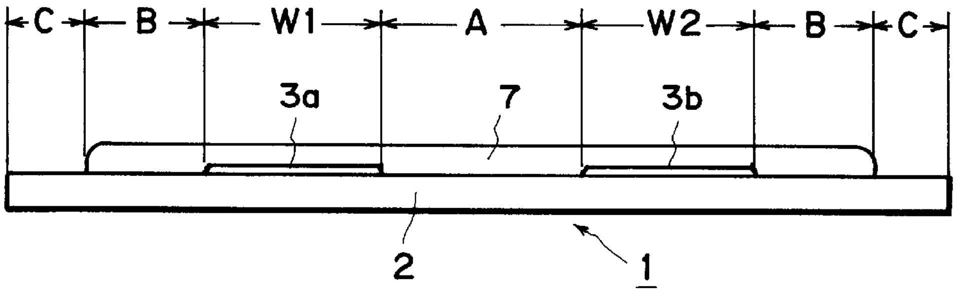
FIG. 11 is a cross-sectional view of a heating member shown in FIG. 10.

Referring to FIGS. 10 and 11, a further embodiment of the present invention will be described. The basic structure is the same as in FIG. 3, and therefore, the description will be made as to only the different portions.

FIG. 10 is a top plan view of a heater, and FIG. 11 is an enlarged sectional view of the heater.

In FIG. 11, designated by c is a width of a margin of a base member between a longitudinal edge of the glass layer 3 and the end of the base member. In this embodiment, the margin c is provided.

The margin c is provided to prevent the glass of the glass layer 3 from entering a dividing groove of a ceramic base member which will be described hereinafter. If the glass of the glass layer 7 enters the dividing groove of the ceramic base material, the cracking of the ceramic base member upon the division thereof is unstable, and therefore rejects. This embodiment is intended to avoid this. In this embodiment, the same advantageous effects as in the foregoing embodiments can be provided.

Figure 12:
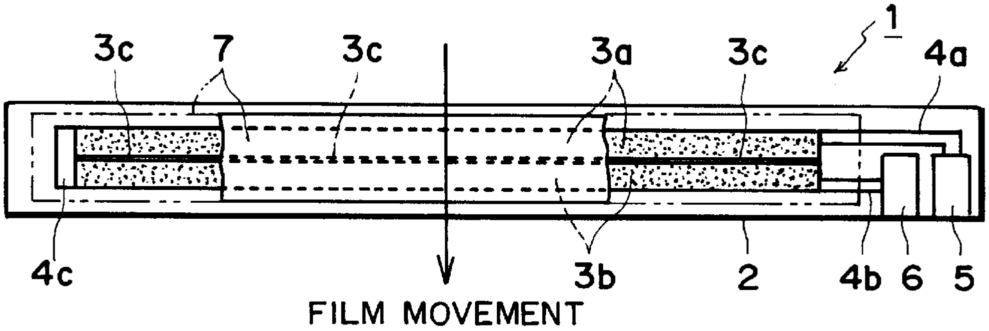
FIG. 12 is a top plan view of a heating member according to a further embodiment.
Figure 13:
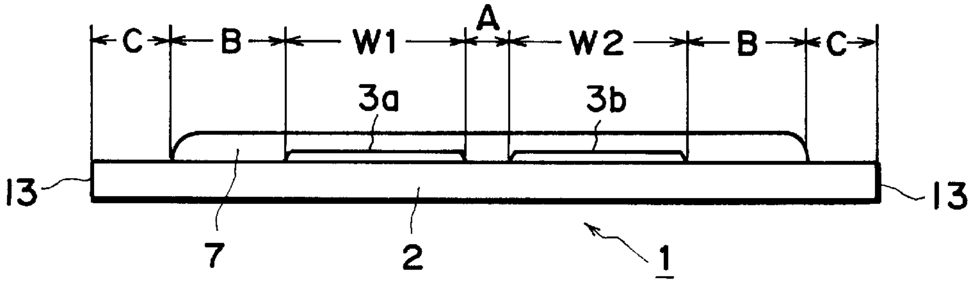
FIG. 13 is a cross-sectional view of a heating member of FIG. 12.

Referring to FIG. 12, the description will be made as to an embodiment in which the first resistor and the second resistor are close to each other. FIG. 12 is a schematic plan view of a heater according to this embodiment, as seen from the heat resistive film side. FIG. 13 is a schematic enlarged cross-sectional view of the heater 1.

The first and second heat generating resistor patterns 3*a* and 3*b* of the heater 1 are produced as follows. One resistor pattern having a width corresponding to both of the first and second resistor patterns 3*a* and 3*b*, is printed and sintered on the ceramic base member. Then, the central portion in the width direction is removed by laser trimming along the longitudinal direction, thus providing two resistor patterns 3*a* and 3*b*. The other structures are the same as the above-described heater 1.

The heater 1 of this embodiment has the similar performance as the heater described hereinbefore, and in addition, the width of the heater can be reduced as compared with the heater of the FIG. 10 embodiment. This is advantageous from the standpoint of withstanding voltage, limiting of printing accuracy, fixing performance and manufacturing cost, relating to the heater width. More particularly, withstanding voltage regulation can be satisfied with minimum heater width, and the usage of the material is improved, and the fixing property in the case of the image heating fixing apparatus can be satisfied, with the minimum heater width.

FIGS. 14–20(*c*) illustrate manufacturing processes of heaters 1.

Figure 14:
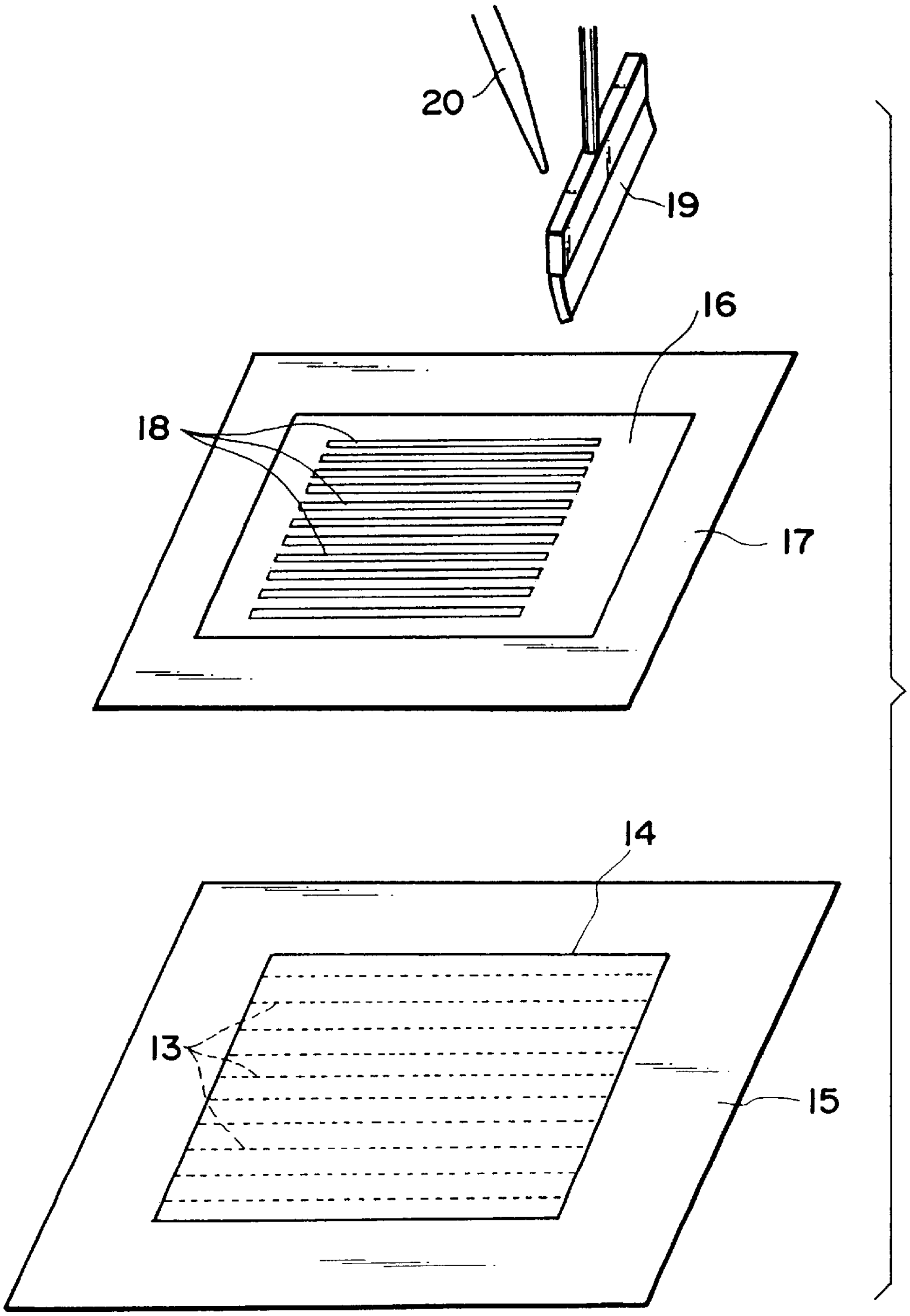
FIG. 14 is a perspective view of a printing means of a resistance member pattern.

(a) In FIG. 14, designated by 14 is a large ceramic blank plate from which a plurality of heater plates can be cut out. In this example, the blank plate 14 is made of an alumina plate having a thickness of 1 mm, a width of 70 mm and a length of 240 mm, from which 11 heater plates 1 can be cut out. In order to facilitate the dividing and separation into the individual heaters, the blank plate 14 is provided with grooves or perforations at regular intervals (approx. 6.36 mm) by a laser scriber or a metal mold.

Designated by 15 is a supporting table for supporting the blank plate 14. The blank plate 14 is positioned on the supporting table 15, and the position thereof is fixed by vacuum attraction at the backside.

Designated by 16 is a pattern printing screen, 17 is a screen frame for stretching and supporting the screen with tension. Designated by 18 is a printing pattern portion of the screen 16. It has 11 parallel stripe patterns each having a width corresponding to both of the first and second resistor patterns 3*a* and 3*b*, provided at a position corresponding to the respective heater portions on the blank plate 14. The printing pattern portion 18 of the screen has low density, through which the resistor paste can be penetrated.

Designated by 19 is a squeezer effective to expand the resistor paste to deposit the resistor paste through the printing pattern 18 of the screen with a constant thickness.

Designated by 20 is a dispenser to supply a constant quantity of the resistor paste in front of the squeezer 19 in the moving direction. The dispenser 20 is supplied with a resistor paste from an unshown paste container.

Figure 15:
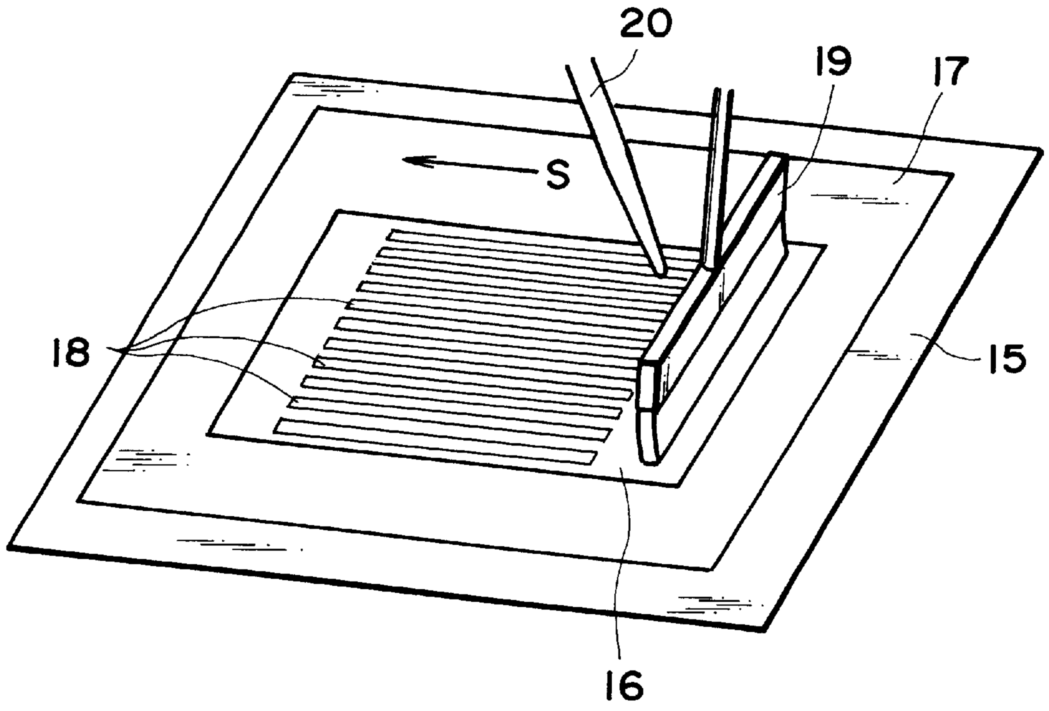
FIG. 15 illustrates a printing method.

(b) On the supporting table on which the blank plate 14 is supported, as shown in FIG. 15, the screen 16 is overlaid in alignment thereof. The resistor paste is supplied by the dispenser 20 in front of the squeezer 19, and then, the squeezer 19 is moved in the direction of an arrow S, by which a resistor pattern having a width corresponding to both of the first and second resistor patterns 3*a* and 3*b*, and the dried, at a predetermined position on the blank plate 18 for 11 heater plate portions.

Figure 16:
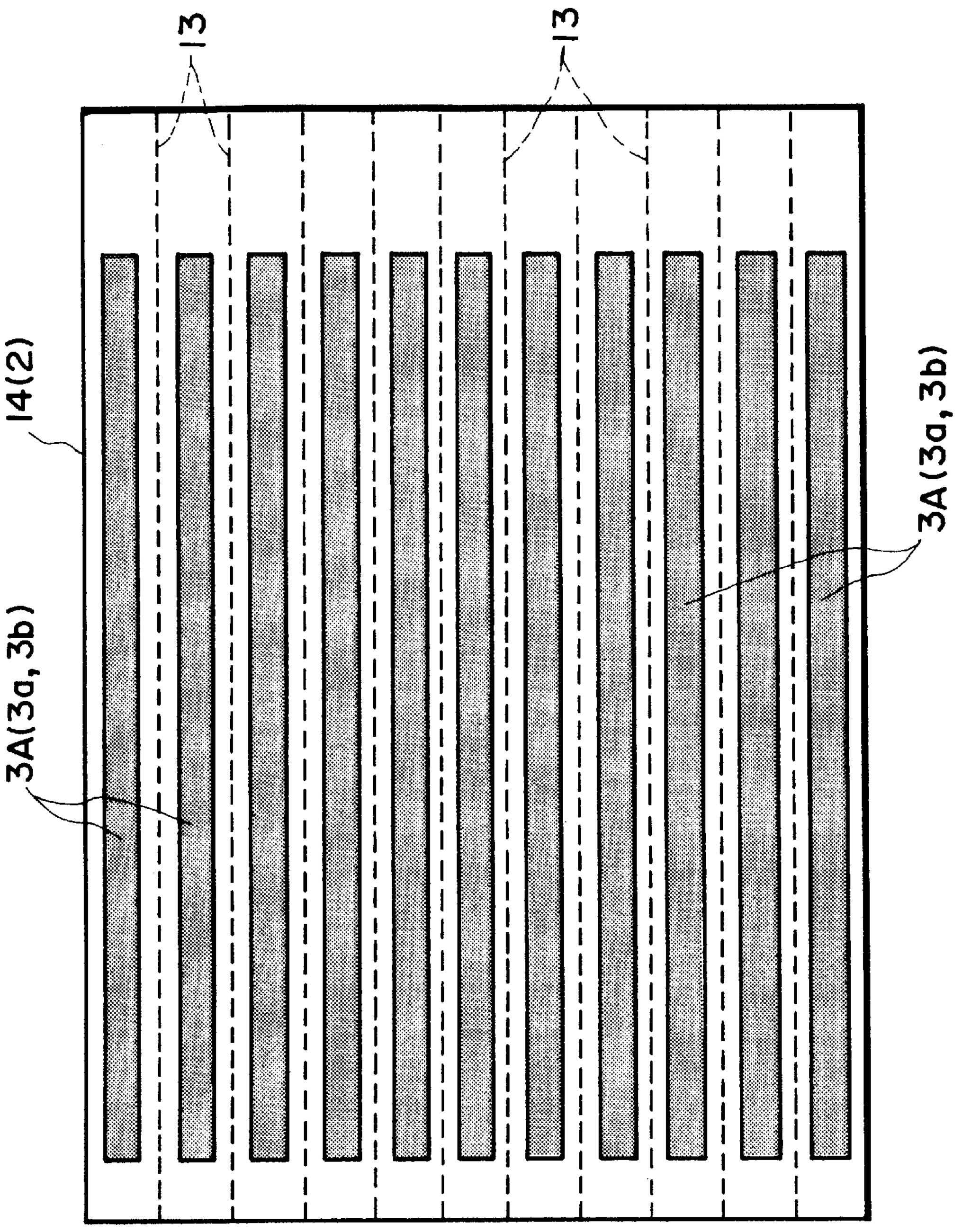
FIG. 16 is a top plan view of a heater base material blank plate after the resistance member pattern printing.
Figure 20A:
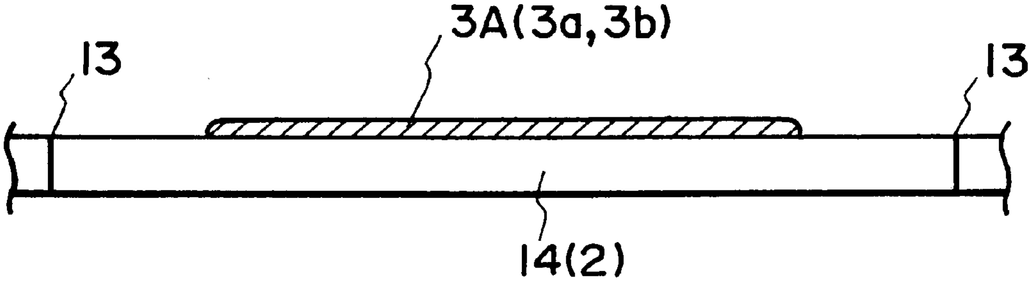
FIGS. 20(*a*)–20(*c*) illustrate a manufacturing process of a heating member.
Figure 20B:
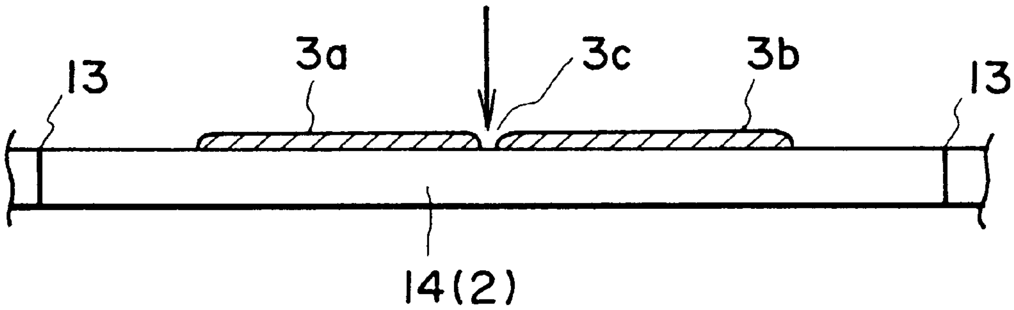
Figure 20C:
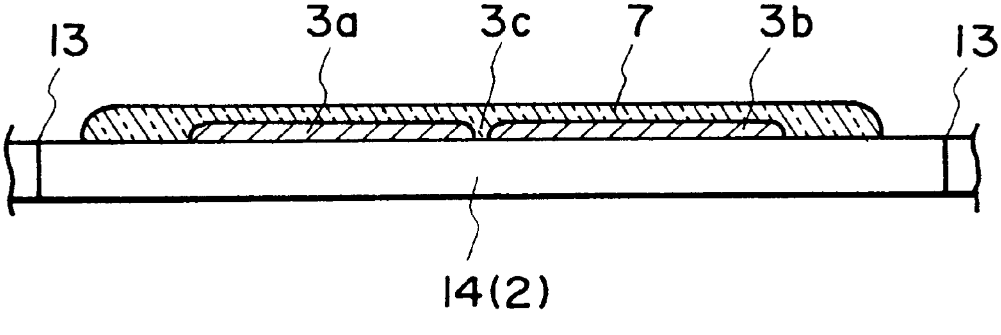

FIG. 16 is a schematic top plan view of the black plate 14 after the printing. FIG. 20(*a*) is an enlarged cross-sectional schematic view of a part thereof. Designated by 3A is a wide resistor pattern corresponding to the first and second resistor patterns 3*a* and 3*b* provided by the printing at the predetermined surface positions corresponding to the heaters.

Figure 17:
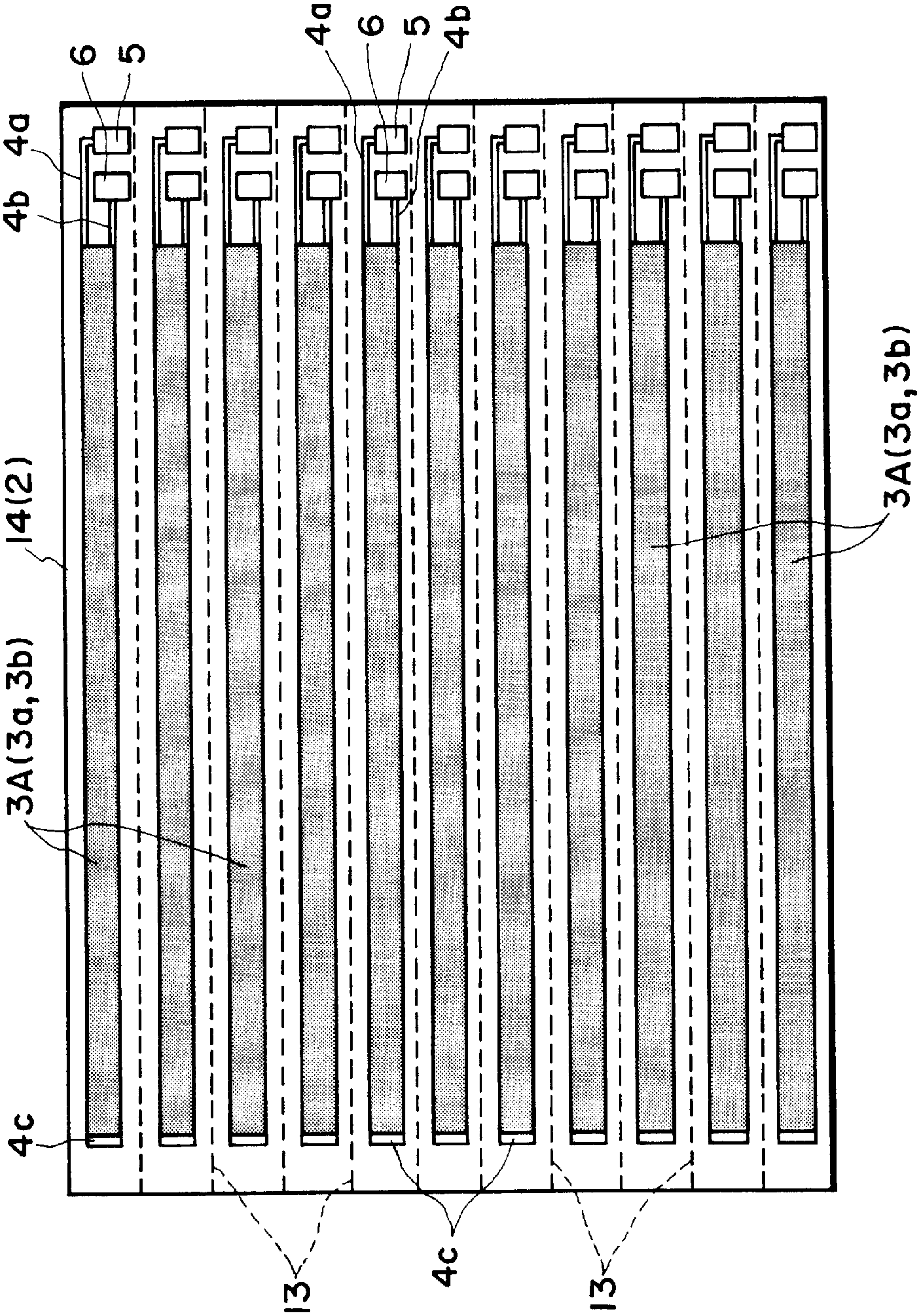
FIG. 17 is a top plan view of a heater base material blank plate after formation of the electroconductive member pattern.
Figure 18:
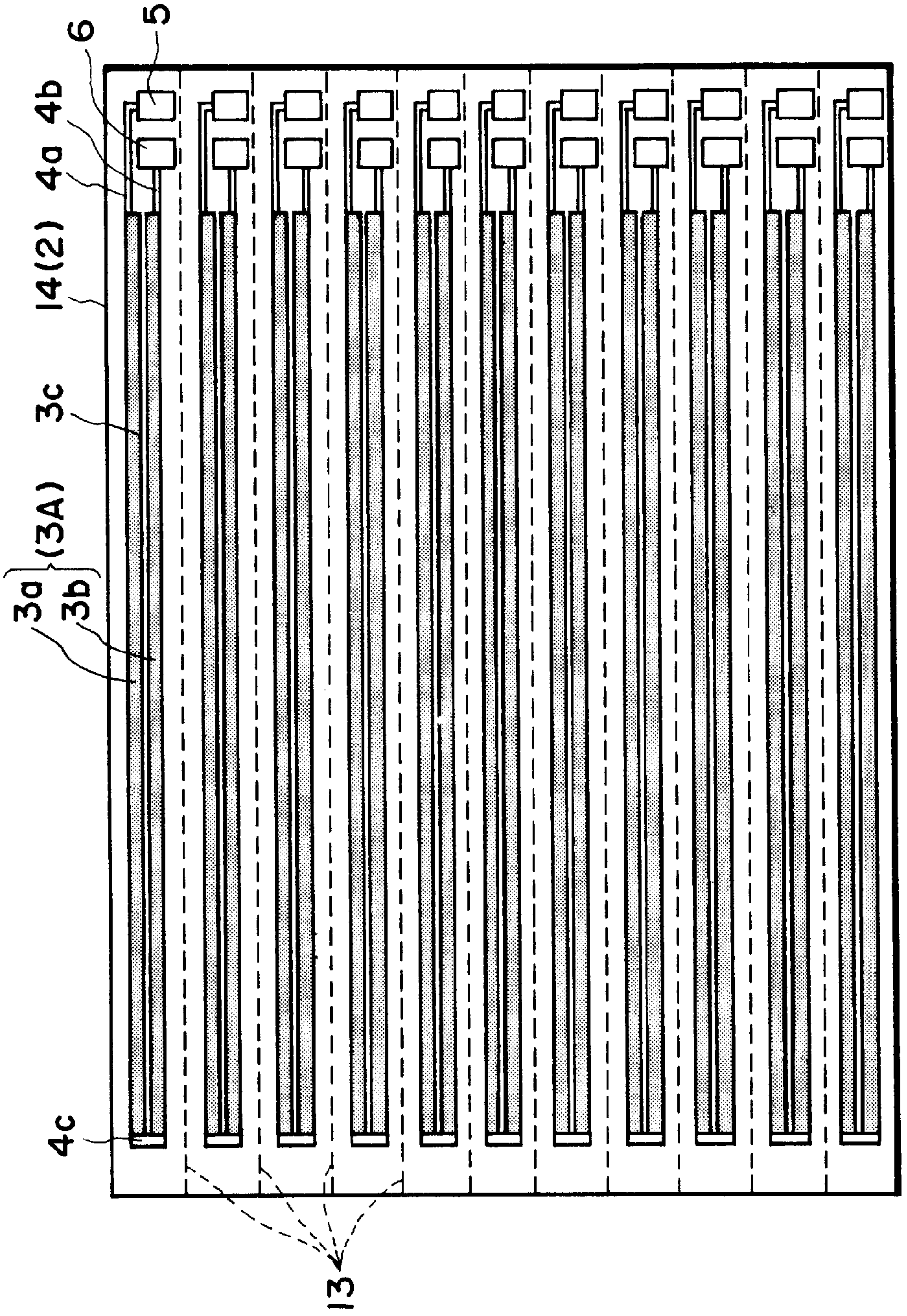
FIG. 18 is a top plan view of a heater base material blank plate after trimming of the resistance member pattern.
Figure 19:
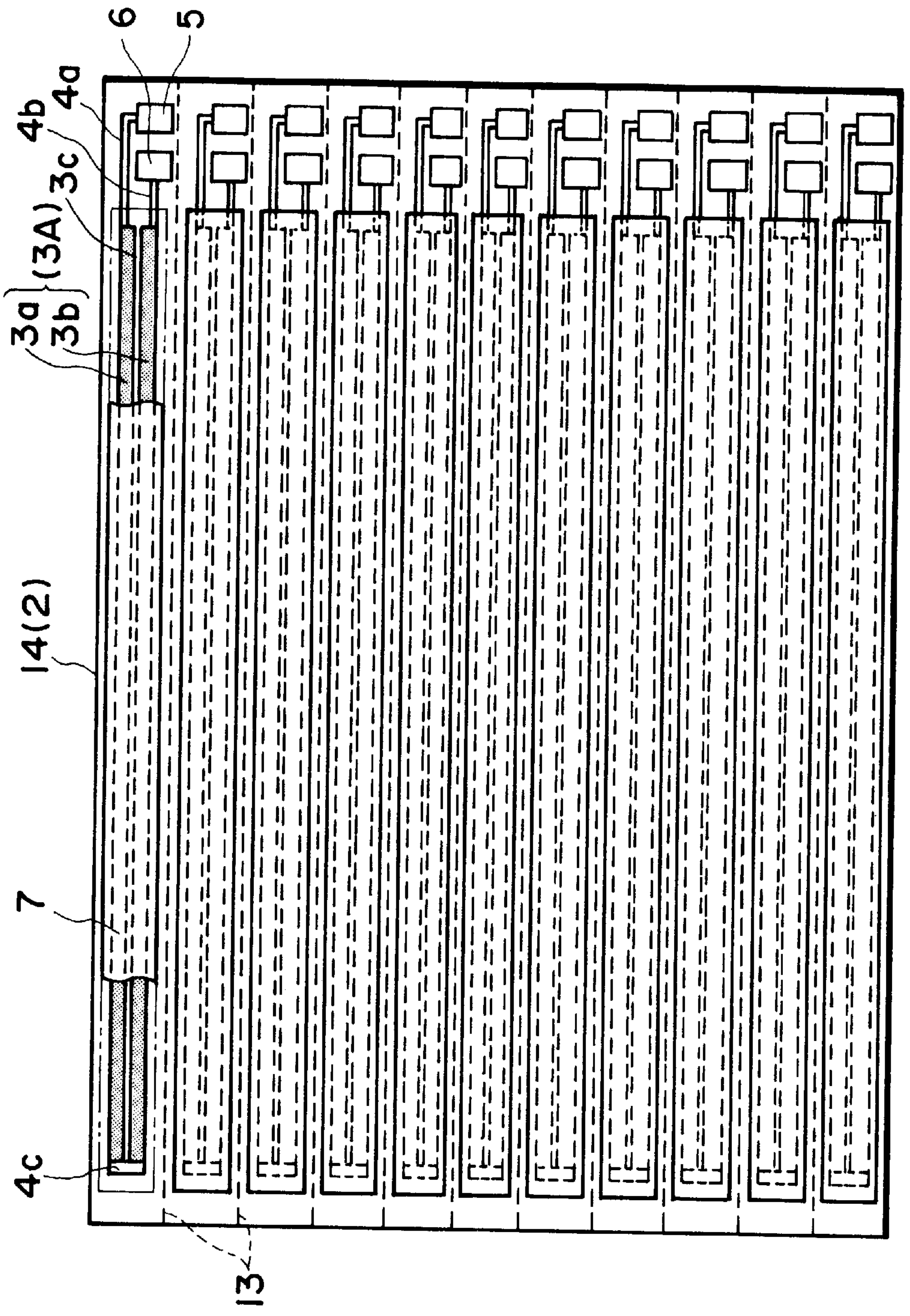
FIG. 19 is a top plan view of a heater base material blank plate after formation of the glass layer.

(c) Subsequently, although not shown in the Figure, a screen having electroconductor patterns 4*a*, 4*b* and 4*c* and two electrode patterns 5 and 6, is overlaid in alignment with the heater plate portions of the blank plate 14, and then, the patterns 4*a*, 4*b*, 4*c*, 5 and 6 are printed with electroconductive paste. FIG. 17 is a top plan view of the blank plate 14 after this printing.

(d) Through the processes (b) and (c), the resistor patterns 3*a*, the conductor patterns 4*a*, 4*b* and 4*c* and two electric energy supply electrode patterns 5 and 6 are printed on the blank plate 14. Then, the blank plate 14 is sintered at a predetermined temperature for a predetermined period.

(e) The wide resistor patterns 3A on the blank plate 14 after the sintering are divided along the length along the width center by laser trimming or abrading into first and second resistor patterns 3*a* and 3*b*.

FIG. 11 is a schematic top plan view of the blank plate 14 after the division trimming. FIG. 20(*b*) is an enlarged sectional view of a part thereof, wherein 3*c* designates division trimming lines.

(f) Then, a screen for printing a glass layer as an electrically insulative layer is overlaid at a predetermined position corresponding to the heater portions of the blank plate 14 after the division trimming process, although not shown in the Figure. Then, the glass layer pattern 7 is printed with the glass paste. Then, it is sintered at a predetermined temperature and for a predetermined period.

FIG. 10 is a schematic plan view partly broken of the blank plate 14 after the printing and sintering of the glass layer pattern 7. FIG. 20(*c*) is an enlarged cross-sectional view of a part thereof.

(g) Subsequently, the blank plate 14 is divided and separated into individual heaters along the grooves or the perforations 13 to provide 11 heaters.

The above-described series of processes can be modified as follows. A wide resistor pattern 3*a* is printed and then sintered, and the pattern is divided into first and second resistor patterns by laser trimming or abrading; electroconductive patterns 4*a*, 4*b* and 4*c* and two electrode patterns 5 and 6 are printed and sintered, or the conductor patterns 4*a*, 4*b*, 4*c* and electrode patterns 5 and 6 and the glass layer pattern 7 are printed and sintered.

The description will be made as to the width of the heater. In the heater of the above-described FIGS. 10 and 12 embodiments, W1 and W2 are widths of the first and second resistor patterns 3*a* and 3*b*.

A is a gap between the first and second resistor patterns 3*a* and 3*b*.

B is a width of the glass layer outside the outer edge of the first and second resistor patterns 3*a* and 3*b*.

C is a width of the glass layer 7 between the longitudinal edge and the dividing groove 13 (margin).

Therefore, the width of the heater 1 is A+2B+2C+W1+W2.

For the sake of safety, UL1950, CSA950, IEC950 or the like regulate the distance between AC lines or between AC and ground. The resistor patterns 3*a* and 3*b* constitute primary AC elements of opposite polarities, the gap therebetween A is required to withstand voltage of 1 KV through extract inspections. The dimension B is at least 1.6 mm for 100 V, and 2.0 mm for 200 V.

As regards the dimension C, 0.3 mm approx. is required.

When the first and second resistor patterns 3*a* and 3*b* are formed by printing as in the heater 1 of the FIG. 10 embodiment, an expansion of printing in the width direction of the resistor patterns 3*a* and 3*b* are empirically about 0.2 mm or larger. In order to the withstand voltage for the glass layer 7, the width of the glass is at least 0.1 mm. In the case of assuring withstanding the voltage and the distance between the resistor patterns 3*a* and 3*b* with the printing accuracy as in the process of FIG. 10, the distance A is at least 0.5 mm.

When the widths W1 and W2 of the first and second resistor patterns 3*a* and 3*b* are required to be 1.2 mm, the width of the heater in the embodiment of FIG. 10 is at least:

$$A+2B+2C+W1+W2=0.5+2\times1.6+2\times0.3+1.2+1.2=6.7\text{ mm}$$

In the case of this heater, 10 heaters are cut out from a ceramic blank plate 14 having a width of 70 mm, and 3 mm is wasted.

On the other hand, according to the process of this embodiment in which a wide resistor pattern 3A corresponding to the first and second patterns 3*a* and 3*b* is first printed and sintered on the ceramic base plate, and then the wide pattern 3A is divided into two resistor patterns 3*a* and 3*b* through laser trimming or abrading, particularly by the use of the laser, the gap between the first and second patterns can be reduced to the minimum. As a result, if the selection is made to the glass layer 7 from the standpoint of high withstanding of voltage, the distance between the resistor patterns 3*a* and 3*b* (A) can be reduced to 0.1 mm.

Figure 21:
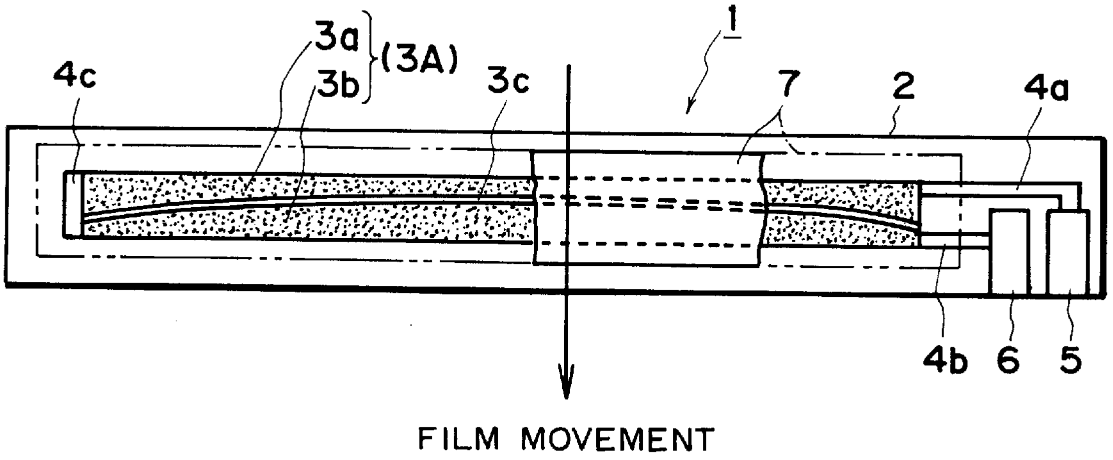
FIGS. 21, 22 are top plan views of heating members of further embodiments.

Therefore, the width of the heater may be 6.36 mm (nearly equal 70 mm/11). As a result, 11 heater plates can be cut out from the ceramic blank plate 14 having a width of 70 mm, so that a larger number of heaters can be manufactured with less waste. Referring to FIG. 21, a further embodiment in which resistors are divided out is shown.

As shown in FIG. 21, the resistor pattern 3A having a wide width is divided along a curved line to provide a first and second resistor patterns 3*a* and 3*b*, by which the maximum temperature portion moves from the center to end portions with the movement of the recording material and the heat resistive film 8 through the nip N, while the total heating amount of the entirety of the resistor is the same. By doing so, the thermal expansion of the paper (recording material P) occurs gradually toward the end portions, and a large thermal expansion occurs at once. For these reasons, the crease is suppressed. Additionally, the evaporation occurs gradually from the central portion to the end portions, and therefore, the trailing of the image can be suppressed.

Figure 22:
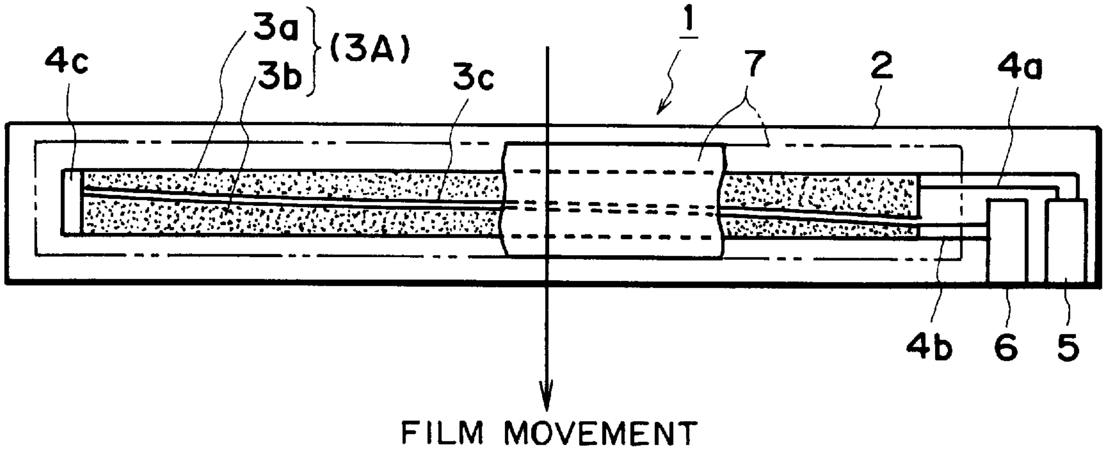
Figure 23A:
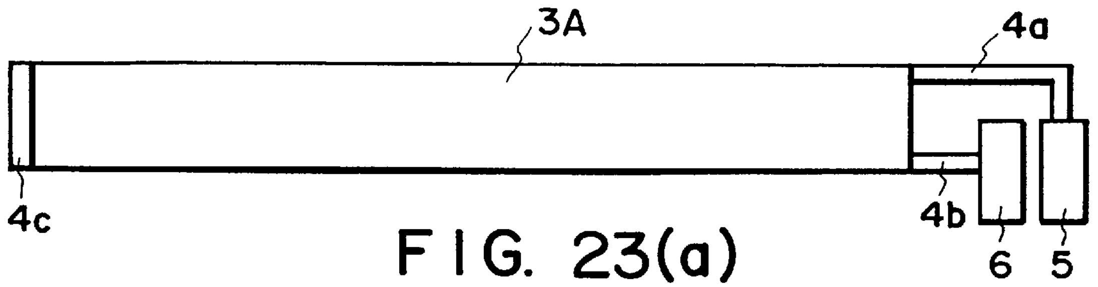
FIGS. 23(*a*)–23(*d*) illustrate a division trimming of a resistance member pattern.
Figure 23B:
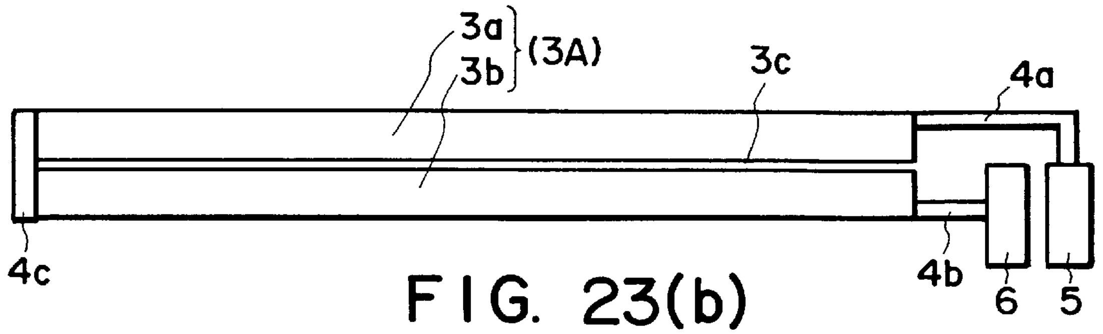
Figure 23C:
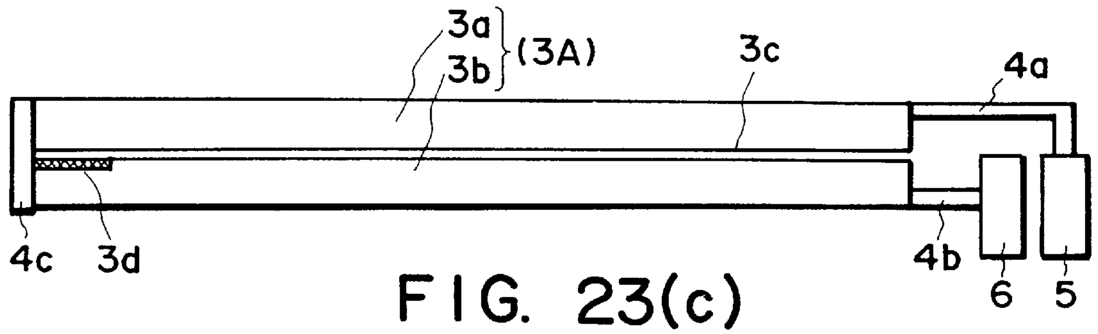
Figure 23D:
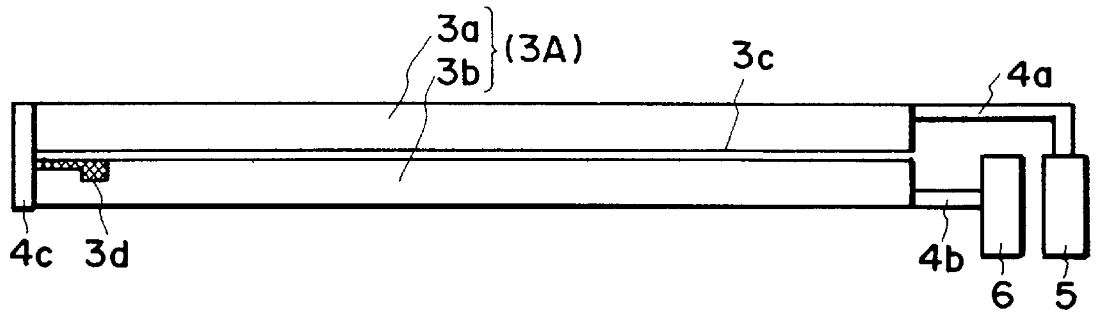
Figure 24A:
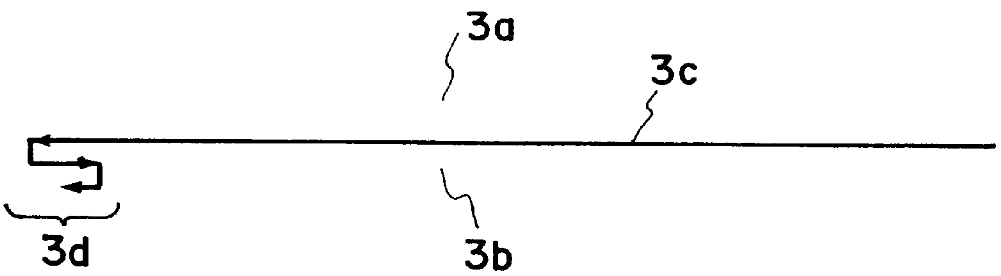
FIGS. 24(*a*)–24(*d*) illustrate a movement locus of the trimming for a laser.
Figure 24B:
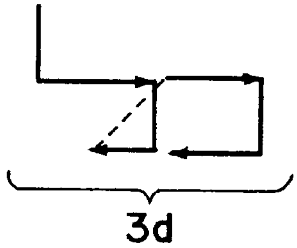
Figure 24C:
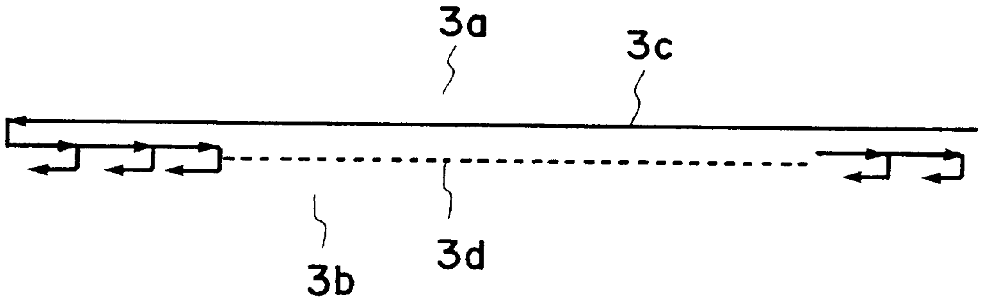
Figure 24D:
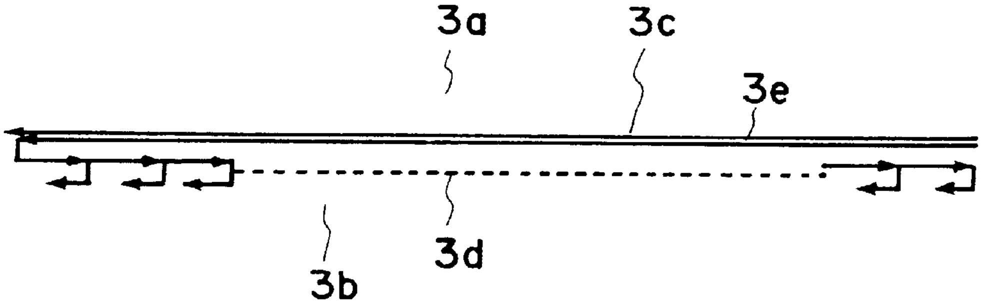

FIG. 22 shows an example in which a wide resistor pattern 3A is divided along an oblique line to provide the first and second resistor patterns 3*a* and 3*b*. By doing so, similar advantageous effects as in FIG. 21 can be provided.

When the resistor patterns 3*a* and 3*b* are simply printed, or the wide resistor 3A simply divided, it is somewhat difficult to provide the required resistance value, and the accuracy of the resistance distribution is not high, and therefore, toner offset is likely to occur due to local heat shortage or heat overage.

In this embodiment, the resistance and the distribution thereof are adjusted by the trimming of the resistor material.

If the outside of the resistor is trimmed, the effective heating width W1+W2+A is reduced, and the residual matter of the resistor material after the trimming is not easily removed. In order to assure withstanding the voltage of the glass layer 7, the glass layer width can be assured for the limit of the scattering due to the trimming. Therefore, the width of the heater tends to increase.

In this embodiment, the trimming is effected inside the resistors 3*a* and 3*b*. As a result, the residual matter of the resistor material produced by the trimming is deposited on the resistor pattern, and no problem occurs if the withstanding of the voltage between the resistors 3*a* and 3*b* is provided by the glass layer 7.

In FIGS. 23(*a*) through 23(*d*), the wide resistor pattern 3A is divided into first and second resistor patterns 3*a* and 3*b* by the laser trimming, and the resistance is partly adjusted by partial trimming (3*d*).

FIG. 23(*a*) shows the division trimming for the first and second resistor patterns 3*a* and 3*b* from the wide resistor pattern 3A.

FIG. 23(*b*) shows the state in which the wide resistor pattern 3A is divided into first and second resistor patterns 3*a* and 3*b* by division trimming (3*c*).

FIGS. 23(*c*) and 23(*d*) show the partial trimming 3*d* of the resistor by short length reciprocation along the resistor pattern 3*b* after the division, for the purpose of partially adjusting the resistance.

FIGS. 24(*a*) through 24(*d*) show a locus of the trimming laser.

In FIG. 24(*a*), the partial trimming 3*d* has just been started at one side after the division trimming 3*c* to adjust the resistance distribution.

In FIG. 24(*b*), the partial trimming 3*d* is carried out. After the partial trimming 3*d* for the width of 10 mm–25 mm with which the difference of the resistance distribution is not remarkable, is completed, then the laser moves as indicated by broken lines to adjust the partial resistance of the adjacent portion.

FIG. 24(*c*) shows the state in which division trimming 3*d* is repeated over the entire length of the resistor pattern 3*a*. When the partial resistance is at a predetermined level in the middle, the trimming is not carried out.

In FIG. 24(*d*), the residual matter resulting from the division trimming 3*c* between the resistor patterns 3*a* and 3*b* is trimmed out (3*e*) over the entire resistor pattern length, by which they are evaporated to assure the insulation between the resistor patterns 3*a* and 3*b*. This step may be omitted if not required.

When the first and second resistors 3*a* and 3*b* are printed respectively as in the heater of FIG. 10 embodiment, the steps (c) and (d) are sufficient.

Description will be made as to which of the two resistor patterns 3*a* and 3*b* is to be subjected to the resistance adjustment. It is preferable that the second resistor pattern 3*b* which is downstream of the fixing nip N is partially trimmed. The reason is as follows. The fixing performance and the offset are determined by the final temperature of the sheet in the nip N. If the resistance distribution of the second resistor pattern 3*b* at the downstream side is uniform, the sheet or paper temperature departing the nip N is uniform along the entire length of the nip, and therefore, both of the fixing performance and the offset problem are satisfactory. Additionally, the degree of melting of the toner is uniform, so that the uneven glossiness does not occur.

Figure 25:
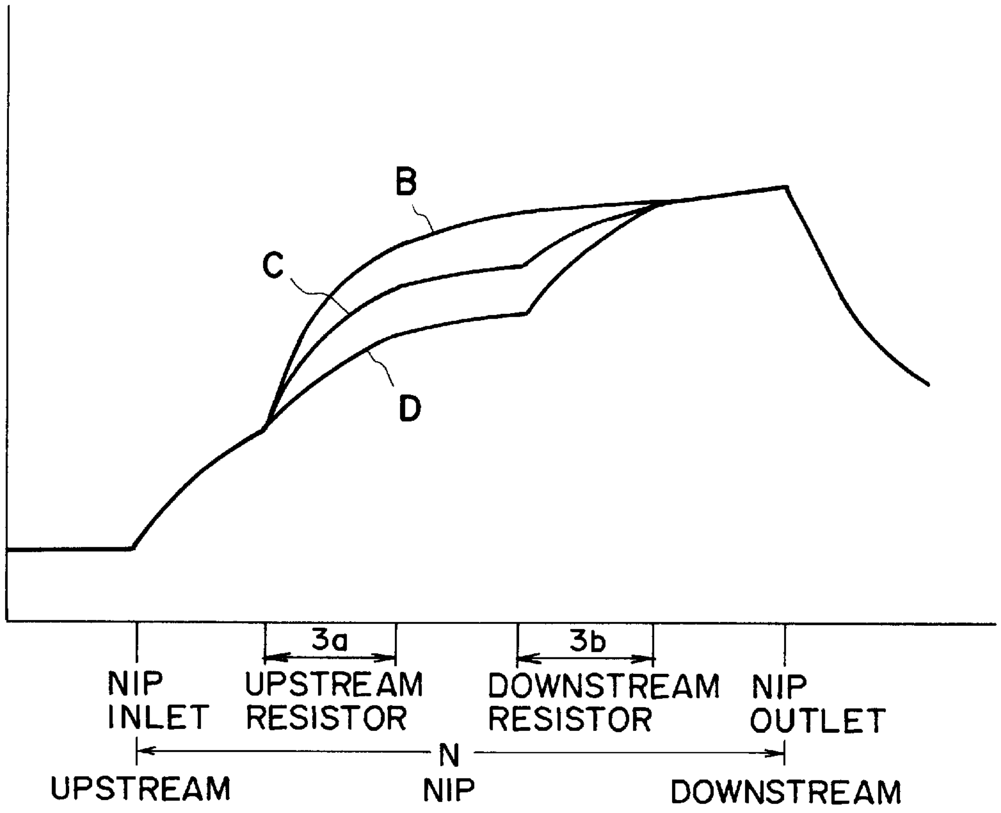
FIGS. 25, 26 show a temperature change of a recording material passing through a nip.

FIG. 25 shows the change of the temperature of the sheet (recording material) passing through the nip N with time. The resistance distribution of the second resistor pattern 3*b* at the downstream side is uniform. A line B represents a portion having a relatively high resistance distribution of the upstream resistor pattern 3*a*, a line C is a middle portion, and a line D represents a low resistance portion.

From the above, it will be understood that the temperature of the sheet is made uniform by the second resistor pattern 3*b* at the downstream side.

Figure 26:
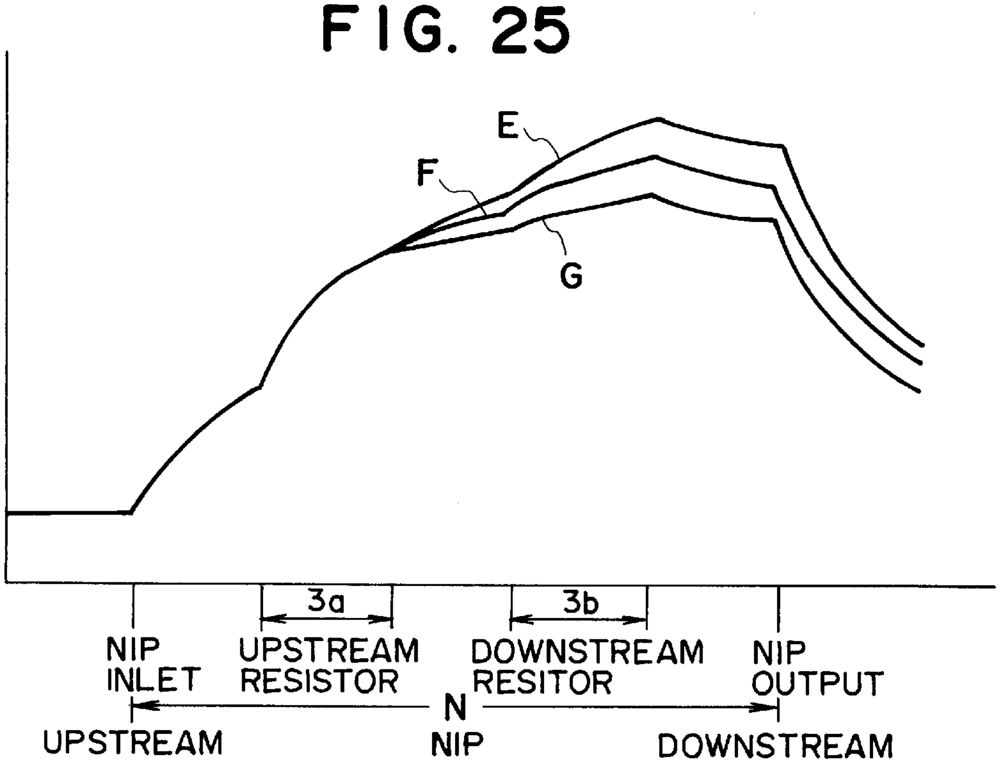

FIG. 26 shows an example in which the resistance distribution of the upstream first resistor pattern 3*a* is uniform. A line E shows a portion having a relatively high resistance distribution of the downstream second resistor pattern 3*b*, a line F represents a middle portion, and a line G represents a low resistance portion.

As will be understood, the temperature of the sheet out of the nip N is uneven with the result of occurrence of toner offset and improper image fixing.

According to the method of this embodiment, even if the resistor pattern includes two stripes, only one resistor pattern, more particularly, the second resistor pattern 3*b* at the downstream side only is partially trimmed, and therefore, the manufacturing time period can be reduced, so that the productivity is improved.

Figure 27A:
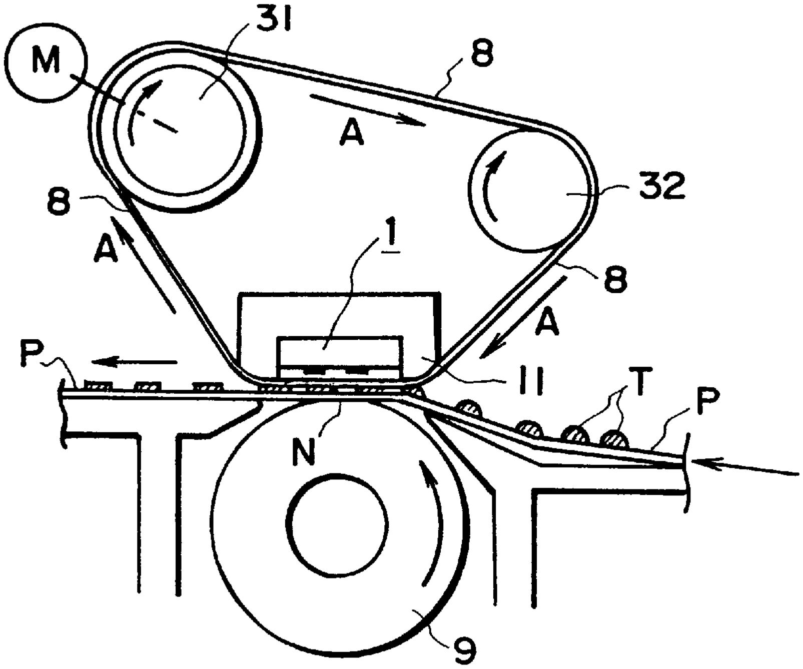
FIGS. 27(*a*)–27(*c*) show a fixing device according to another embodiment.
Figure 27B:
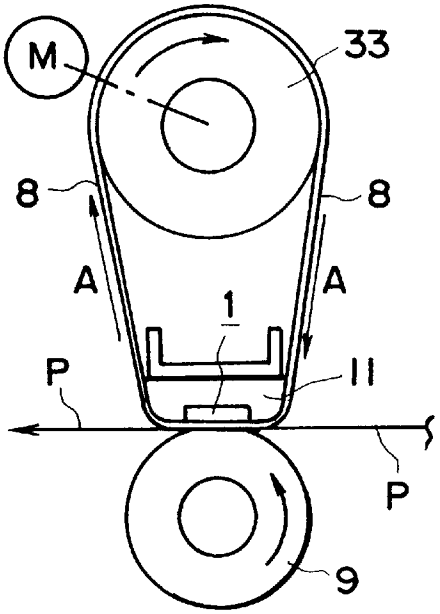
Figure 27C:
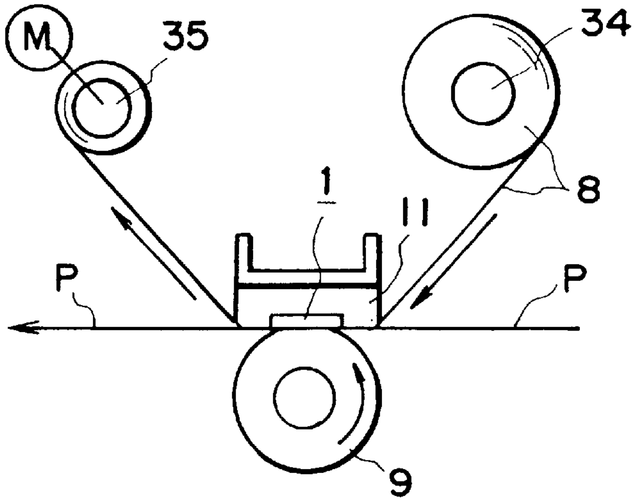

Referring to FIGS. 27(*a*) through 27(*c*), an image fixing apparatus which is another image heating apparatus to which the above-described heater is usable.

FIGS. 27(*a*), 27(*b*) and 27(*c*), are examples of a heating apparatus of a film heating type.

In FIG. 27(*a*), a heat resistive film 8 in the form of an endless belt is extended and stretched around three parallel members, namely a first film roller 31, a second film roller 32 and a heater 1. The pressing roller 9 is urged toward the heater 1 with the film 8 therebetween. The heat resistive film 8 is rotated by the first film roller 31 or by the pressing roller 9. When the first film roller 31 is used as the driving roller, the pressing roller 9 is rotated by the film.

In FIG. 27(*b*), the heat resistive film 8 in the form of an endless belt is extended and stretched around the two members namely the heater 1 and one film roller 33. The pressing roller 9 is urged toward the heater 1 with the film 8 therebetween, and the heat resistive film 8 is rotated by the film roller 33 or by the pressing roller 9. When the film roller 33 is used as the driving roller, the pressing roller 2 is rotated by the film.

In FIG. 27(*c*), the heat resistive film 8 is not in the form of an endless film, but is a non-endless film having a large length rolled on a supply shaft 34. It is supplied out by way of the heater 1 to a take-up shaft 35. The pressing roller 9 is urged to the heater 1 with the film therebetween to travel the film 8 to the take-up shaft 35. The pressing roller 9 may be a film driving roller.

While the invention has been described with reference to the structures disclosed herein, it is not confined to the details set forth and this application is intended to cover such modifications or changes as may come within the purposes of the improvements or the scope of the following claims.

What is claimed is:

1. An image heating apparatus, comprising:

a heater having an elongated base member, first and second resistors extended on said base member in a longitudinal direction thereof, an electrical connecting portion, adjacent one end of said base member, for electrically connecting said first and second resistors, first and second electrodes provided only adjacent the other end of said base member and electrically connected with said first and second resistors, respectively, wherein said first and second resistors generate heat by electrical energy supplied between said first and second electrodes;

a film having a surface in slidable contact with said heater and the film's other surface movable with a recording material carrying an image while being in contact therewith, wherein said film moves in a direction perpendicular to a longitudinal direction of said heater, and the image on the recording material is heated by the heat from said heater;

wherein said first and second electrodes are placed on a single surface of said base member, and said first electrode is positioned such that said first electrode does not overlap with said second electrode with respect to a longitudinal direction of said base member and is spaced away from said second electrode.

2. An apparatus according to claim 1, wherein said first resistor and said second resistor have different resistances.

3. An apparatus according to claim 1, wherein said first resistor and said second resistor are made of different materials.

4. An apparatus according to claim 1, wherein said first resistor and said second resistor have different widths measured in a direction perpendicular to the longitudinal direction.

5. An apparatus according to claim 1, wherein said first resistor and said second resistor have different thicknesses.

6. An apparatus according to claim 1, further comprising a temperature sensor for sensing a temperature of said base member.

7. An apparatus according to claim 1, wherein said base member is alumina.

8. An apparatus according to claim 1, wherein said first resistor has a width, measured in a direction perpendicular to the longitudinal direction, which increases from a central portion thereof to an end portion, and said second resistor has a width which decreases from a central portion thereof to an end portion.

9. An apparatus according to claim 1, wherein said first resistor has a width, measured in a direction perpendicular to the longitudinal direction, which increases from an end thereof to the other end thereof, and said second resistor has a width which decreases from an end thereof to the other end thereof, which is adjacent the other end of said first resistor.

10. An apparatus according to claim 1, wherein a gap is provided between said first resistor and said second resistor, wherein the gap is formed by laser trimming.

11. An apparatus according to claim 10, wherein resistances of said first resistor and said second resistor are adjusted by the laser trimming.

12. An apparatus according to claim 11, wherein a side of said first resistor adjacent said second resistor is trimmed.

13. An apparatus according to claim 1, wherein said second resistor is disposed downstream of said first resistor in the longitudinal direction, and a resistance of said second resistor is adjusted.

14. An apparatus according to claim 1, further comprising a back-up member cooperating with said heater to form a nip with the film therebetween.

15. An apparatus according to claim 1, wherein the image is an unfixed toner image which is fixed on the recording material while the recording material passes through the nip.

16. An apparatus according to claim 14, wherein said first and second resistors are within a width, in a direction of movement of the recording material, of the nip.

17. An apparatus according to claim 1, further comprising a second electrical connecting portion for connecting said first resistor and said first electrode, wherein a width of said second connecting portion measured along a direction perpendicular to the longitudinal direction is smaller than a width of said first resistor measured in the same direction.

18. An apparatus according to claim 1, further comprising a second electrical connecting portion for connecting said second resistor and said second electrode, wherein a width of said second connecting portion measured along a direction perpendicular to the longitudinal direction is smaller than a width of said second resistor measured in the same direction.

19. An apparatus according to claim 1, wherein said first and second electrode are placed on the same side of said base member.

20. A heater comprising:

an elongated base member;

first and second resistors extended on said base member in a longitudinal direction thereof;

an electrical connecting portion, adjacent one end of said base member, for electrically connecting said first and second resistors;

first and second electrodes provided only adjacent the other end of said base member and electrically connected with said first and second resistors, respectively;

wherein said first and second resistors generate heat by electrical energy supplied between said first and second electrodes; and wherein said first and second electrodes are placed on a single surface of said base member, and said first electrode is positioned such that said first electrode does not overlap with said second electrode with respect to a longitudinal direction of said base member and is spaced away from said second electrode.

21. A heater according to claim 20, wherein said first resistor and said second resistor have different resistances.

22. A heater according to claim 20, wherein said first resistor and said second resistor are made of different materials.

23. A heater according to claim 20, wherein said first resistor and said second resistor have different widths measured in a direction perpendicular to the longitudinal direction.

24. A heater according to claim 20, wherein said first resistor and said second resistor have different thicknesses.

25. A heater according to claim 20, further comprising a temperature sensor for sensing a temperature of said base member.

26. A heater according to claim 20, wherein said base member is alumina.

27. A heater according to claim 20, wherein said first resistor has a width, measured in a direction perpendicular to the longitudinal direction, which increases from a central portion thereof to an end portion, and said second resistor has a width which decreases from a central portion thereof to an end portion.

28. A heater according to claim 20, wherein said first resistor has a width, measured in a direction perpendicular to the longitudinal direction, which increases from an end thereof to the other end thereof, and said second resistor has a width which decreases from an end thereof to the other end thereof, which is adjacent the other end of said first resistor.

29. A heater according to claim 20, wherein a gap is provided between said first resistor and said second resistor, wherein the gap is formed by laser trimming.

30. A heater according to claim 29, wherein resistances of said first resistor and said second resistor are adjusted by the laser trimming.

31. A heater according to claim 30, wherein a side of said first resistor adjacent said second resistor is trimmed.

32. A heater according to claim 20, further comprising a second electrical connecting portion for connecting said first resistor and said first electrode, wherein a width of said second connecting portion measured along a direction perpendicular to the longitudinal direction is smaller than a width of said first resistor measured in the same direction.

33. A heater according to claim 20, further comprising a second electrical connecting portion for connecting said second resistor and said second electrode, wherein a width of said second connecting portion measured along a direction perpendicular to the longitudinal direction is smaller than a width of said second resistor measured in the same direction.

34. A heater according to claim 20, wherein said first and second electrodes are placed on the same side of said base member.

* * * * *

UNITED STATES PATENT AND TRADEMARK OFFICE

CERTIFICATE OF CORRECTION

PATENT NO. : 6,323,460 B1 Page 1 of 1
DATED : November 27, 2001
INVENTOR(S) : Yasumasa Ohtsuka It is certified that error appears in the above-identified patent and that said Letters Patent is hereby corrected as shown below:

Title page,
Item [56], References Cited, FOREIGN PATENT DOCUMENTS:
"061188178 4/1994 (JP)" should read -- 6-118817 4/1994 (JP) --.

Column 3,
Line 25, "enlarged" should read -- enlarged view --.

Column 4,
Line 19, "placed" should read -- plate --; and "place" should read -- placed --.

Column 5,
Line 17, "microns-100" should read -- microns - 100 --.

Column 10,
Line 33, "the" (1st occurrence) should be deleted.

Column 11,
Line 40, "the" (1st occurrence) should be deleted.

Signed and Sealed this

Sixth Day of August, 2002

*Attest:*

JAMES E. ROGAN

*Attesting Officer* *Director of the United States Patent and Trademark Office*